(12) United States Patent
Miyazawa

(10) Patent No.: US 8,108,917 B2
(45) Date of Patent: Jan. 31, 2012

(54) MANAGEMENT APPARATUS

(75) Inventor: Masafumi Miyazawa, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 786 days.

(21) Appl. No.: 11/614,116

(22) Filed: Dec. 21, 2006

(65) Prior Publication Data

US 2007/0150727 A1    Jun. 28, 2007

(30) Foreign Application Priority Data

Dec. 28, 2005 (JP) ................................. 2005-380152

(51) Int. Cl.
  *H04L 29/06* (2006.01)
(52) U.S. Cl. ............................................ 726/6; 713/155
(58) Field of Classification Search .................. 726/6, 1, 726/5, 24; 713/155, 156
  See application file for complete search history.

(56) References Cited

U.S. PATENT DOCUMENTS

| | | | | |
|---|---|---|---|---|
| 5,970,408 | A * | 10/1999 | Carlsson et al. | 455/439 |
| 7,415,607 | B2 * | 8/2008 | Sinn | 713/158 |
| 7,418,597 | B2 * | 8/2008 | Thornton et al. | 713/175 |
| 7,447,685 | B2 * | 11/2008 | Nye | 707/3 |
| 7,484,089 | B1 * | 1/2009 | Kogen et al. | 713/156 |
| 7,568,095 | B2 * | 7/2009 | Thornton et al. | 713/156 |
| 7,581,011 | B2 * | 8/2009 | Teng | 709/229 |
| 7,650,496 | B2 * | 1/2010 | Thornton et al. | 713/158 |
| 7,650,497 | B2 * | 1/2010 | Thornton et al. | 713/158 |
| 7,653,810 | B2 * | 1/2010 | Thornton et al. | 713/158 |
| 7,698,549 | B2 * | 4/2010 | Thornton et al. | 713/156 |
| 7,730,145 | B1 * | 6/2010 | Frenkel et al. | 709/206 |
| 7,735,123 | B2 * | 6/2010 | Adams et al. | 726/6 |
| 7,814,314 | B2 * | 10/2010 | Gentry et al. | 713/158 |
| 2002/0053023 | A1 * | 5/2002 | Patterson et al. | 713/156 |
| 2002/0166049 | A1 * | 11/2002 | Sinn | 713/175 |
| 2002/0184444 | A1 * | 12/2002 | Shandony | 711/118 |
| 2002/0184493 | A1 * | 12/2002 | Rees | 713/158 |
| 2004/0133520 | A1 * | 7/2004 | Callas et al. | 705/51 |

(Continued)

FOREIGN PATENT DOCUMENTS

EP    1237329 A2    4/2002

(Continued)

OTHER PUBLICATIONS

European Patent Office, European Search Report for EP Appl'n No. 06026332 (counterpart to above-captioned patent appl'n) mailed May 7, 2007.

(Continued)

*Primary Examiner* — David García Cervetti
(74) *Attorney, Agent, or Firm* — Baker Botts L.L.P.

(57) ABSTRACT

There is provided a management apparatus, which comprises a transmission condition judgment unit which refers to a target digital certificate and judges whether a predetermined transmission condition is satisfied based on a period of validity written in the target digital certificate, a mail generating unit which generates an e-mail provided with link information to a web page where updating operation on the target digital certificate is acceptable if the predetermined transmission condition is judged as satisfied by the transmission condition judgment unit, a destination setting unit which sets an destination e-mail address of the e-mail generated by the mail generating unit, and a mail transmission unit which transmits the e-mail generated by the mail generating unit to the destination e-mail address set by the destination setting unit.

6 Claims, 14 Drawing Sheets

U.S. PATENT DOCUMENTS

| | | | |
|---|---|---|---|
| 2004/0199469 A1* | 10/2004 | Barillova et al. | 705/44 |
| 2005/0007620 A1* | 1/2005 | Kouno | 358/1.14 |
| 2005/0069136 A1* | 3/2005 | Thornton et al. | 380/277 |
| 2005/0071630 A1* | 3/2005 | Thornton et al. | 713/156 |
| 2005/0074124 A1* | 4/2005 | Thornton et al. | 380/277 |
| 2005/0076199 A1* | 4/2005 | Thornton et al. | 713/156 |
| 2005/0076200 A1* | 4/2005 | Thornton et al. | 713/156 |
| 2005/0076201 A1* | 4/2005 | Thornton et al. | 713/156 |
| 2005/0076202 A1* | 4/2005 | Thornton et al. | 713/156 |
| 2005/0076203 A1* | 4/2005 | Thornton et al. | 713/156 |
| 2005/0076204 A1* | 4/2005 | Thornton et al. | 713/156 |
| 2005/0076205 A1* | 4/2005 | Thornton et al. | 713/156 |
| 2005/0078830 A1* | 4/2005 | Thornton et al. | 380/277 |
| 2005/0081025 A1* | 4/2005 | Thornton et al. | 713/155 |
| 2005/0081026 A1* | 4/2005 | Thornton et al. | 713/156 |
| 2005/0081027 A1* | 4/2005 | Thornton et al. | 713/156 |
| 2005/0081028 A1* | 4/2005 | Thornton et al. | 713/156 |
| 2005/0081029 A1* | 4/2005 | Thornton et al. | 713/156 |
| 2005/0091484 A1* | 4/2005 | Thornton et al. | 713/156 |
| 2005/0114461 A1* | 5/2005 | Shirai et al. | 709/207 |
| 2006/0015716 A1* | 1/2006 | Thornton et al. | 713/155 |
| 2006/0179299 A1* | 8/2006 | Tanimoto et al. | 713/158 |
| 2006/0259762 A1* | 11/2006 | Tanimoto | 713/156 |
| 2006/0294368 A1* | 12/2006 | Adams et al. | 713/156 |
| 2007/0050457 A1* | 3/2007 | Kusano et al. | 709/206 |
| 2007/0061567 A1* | 3/2007 | Day et al. | 713/159 |
| 2010/0235893 A1* | 9/2010 | Adams et al. | 726/6 |
| 2010/0275013 A1* | 10/2010 | Novack et al. | 713/156 |

FOREIGN PATENT DOCUMENTS

| | | |
|---|---|---|
| JP | H10-276186 A | 10/1998 |
| JP | 2001-197054 A | 7/2001 |
| JP | 2002-215826 A | 8/2002 |
| JP | 2003273855 A | 9/2003 |
| JP | 2004227451 A | 8/2004 |
| JP | 2005269558 A | 9/2005 |
| JP | 2006-222535 A | 8/2006 |
| WO | 2004091166 A1 | 10/2004 |

OTHER PUBLICATIONS

J. Klensin, "Simple mail Transfer Protocol," Internet-Draft, Jul. 7, 2005, Expired Jan. 8, 2006.

State Intellectual Property Office of P.R.C.; Notification of the Second Office Action in Chinese Patent Application No. 200610172016.6 (counterpart to the above-captioned U.S. patent application) mailed Jun. 5, 2009.

Japan Patent Office; Notification of Reasons of Rejection in Japanese Patent Application No. 2005-380152 (Counterpart to the above-captioned U.S. patent application) mailed Nov. 5, 2009.

* cited by examiner

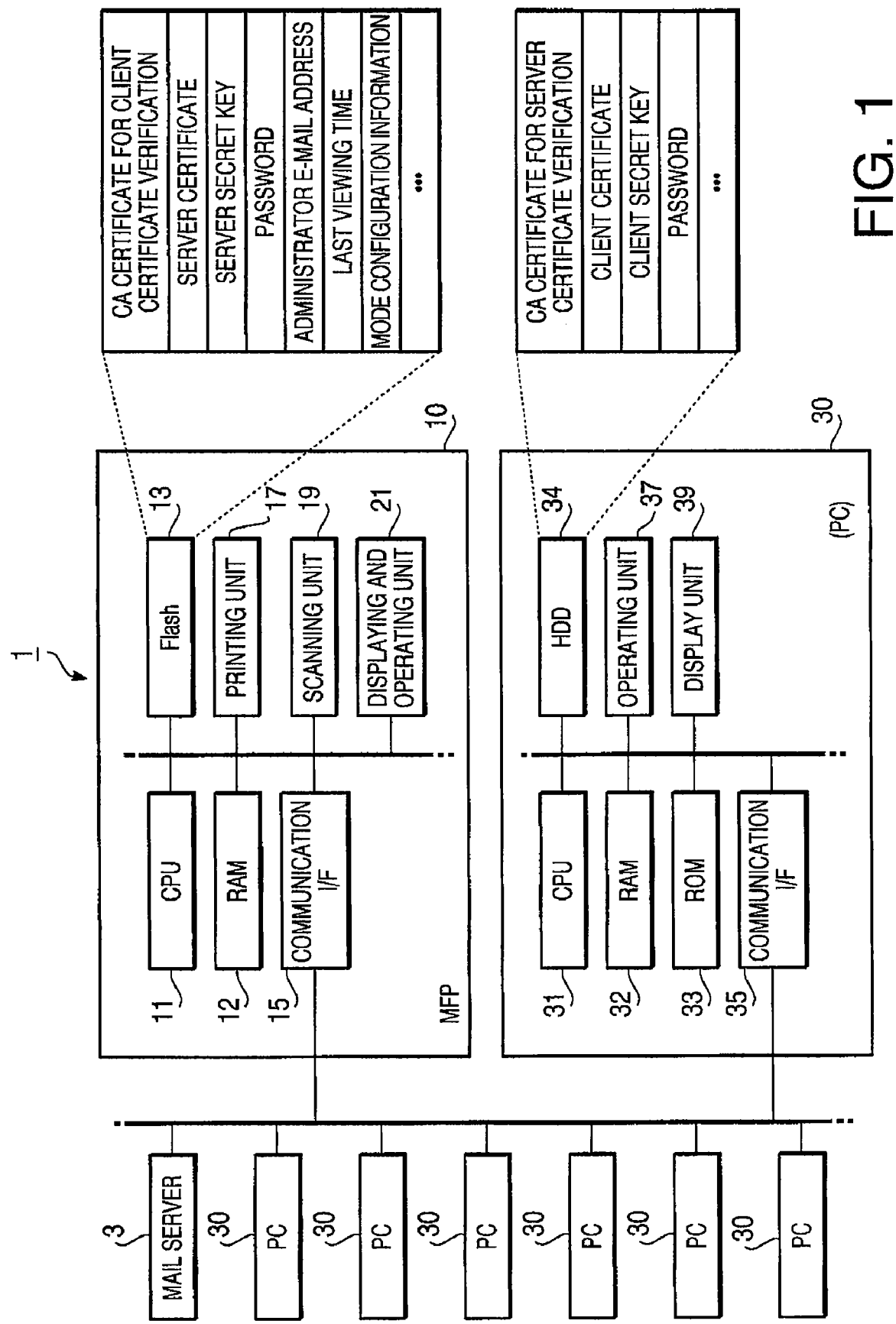

CREATION OF SELF-SIGNED SERVER
CERTIFICATE

COMMON NAME [BRN_220099] (UP TO 64 CHARACTERS)

ORGANIZATION [    ] (UP TO 64 CHARACTERS; OMISSION ALLOWED)

DEPARTMENT [    ] (UP TO 64 CHARACTERS; OMISSION ALLOWED)

CITY [    ] (UP TO 64 CHARACTERS; OMISSION ALLOWED)

PREFECTURE [    ] (UP TO 64 CHARACTERS; OMISSION ALLOWED)

COUNTRY [  ] (2 CHARACTERS; OMISSION ALLOWED)

VALIDITY (COMMENCEMENT) [2005] / [9] / [14] LOCAL TIME

VALIDITY (EXPIRATION) [2005] / [9] / [14] LOCAL TIME

[ OK ]  [ CANCEL ]

FIG.11A

SELF-SIGNED SERVER CERTIFICATE

—— BEGIN CERTIFICATE REQUEST——

MIIBwDCCASkCAQIwUDEmMCQGA1UEAxMdTIBJ
QzRCNEJCLmFwLmJyb3RoZXJJbmcm91Cc5uZXQxF
TATBgNVBAsTDDAwMzA2RUM0QjRCQjEPMA0GA
1UECxMGSjc5NDJBMIGf MA0GCSqGSIb3DQEBQ
UAA4GNADCBiQKBgQDH4oQ2skq6Jvz3dh8O001b
89ojBAQE H5IStEO6+vRaz7oxjngO6m3/bO0IAtioigc
T5IYFyifwZFXm2W+ZhzAIWIOjw=

—— END CERTIFICATE REQUEST——

[ SAVE IN A FILE ]

[ BACK ]

FIG.11B

ISSUE OF CLIENT CERTIFICATE

E-Mail [        ]

[ OK ]  [ CANCEL ]

FIG.12A

CLIENT CERTIFICATE

——BEGIN CERTIFICATE REQUEST——
MIIBwDCCASkCAQIwUDEmMCQGA1UEAxMdTIBJ
QzRCNEJCLmFwLmJyb3RoZXJncm91cC5uZXQxF
TATBgNVBAsTDDAwMzA2RUM0QjRCQjEPMA0GA
1UECxMGSjc5NDJBMIGfMA0GCSqGSIb3DQEBQ
UAA4GNADCBiQKBgQDH4oQ2skq6Jvz3dh8O001b
89ojBAQE H5IStEO6+vRaz7oxjngO6m3/bO0IAtioigc
T5plYFyifwZFXm2W+ZhzAlWlOjw=
——END CERTIFICATE REQUEST——

[ SAVE IN A FILE ]

[ BACK ]

FIG.12B

CONFIGURATION OF ADMINISTRATOR INFORMATION

E-Mail [        ]

[ OK ]  [ CANCEL ]

FIG.13

MANAGEMENT APPARATUS

CROSS REFERENCE TO RELATED APPLICATION

This application claims priority under 35 U.S.C. §119 from Japanese Patent Application No. 2005-380152, filed on Dec. 28, 2005. The entire subject matter of the application is incorporated herein by reference.

BACKGROUND

1. Technical Field

Aspects of the present invention relate to a management apparatus, which manages digital certificates written with the period of validity.

2. Related Art

Heretofore, as for communication technology, SSL (Secure Socket Layer) communication technique is widely used. In SSL communication, a public key is notified through a digital certificate (digital ID) to enter into a cipher communication. In order to establish high-security communication, a digital certificate used in SSL communication is commonly set its effective period, and an expired digital certificate is generally prohibited to use for the communication.

Therefore, each owner of the digital certificate is required to grasp the expiration date in possession always, and required to carry out updating operation of the digital certificate as appropriate. However, some owners may forget the expiration date, and in case of losing the period, the users may be unable to use the terminal unit in network using the digital certificate when necessary. That is to say, a communication system using the digital certificate has been inconvenient on this point for users.

Japanese Patent Provisional Publication No. 2005-269558 (hereafter, referred to as JP 2005-269558A) discloses a technique for resolving the problem of validity expiration. According to the technique disclosed in JP 2005-269558A, the approaching expiration date is notified to users by e-mail in accordance with each expiration date of the digital certificate.

Conventionally, however, it was a sort of sending an e-mail written with a message for urging update of the digital certificate simply according to the expiration date and that may press users annoying to move on to updating operation. As a consequence of such mood of the users, carrying out updating operation may be delayed, and some users may cause expiration of the digital certificate in spite of having been warned.

SUMMARY

Aspects of the present invention are advantageous in that a management apparatus capable of reducing workload concerning an updating operation of a digital certificate and to prevent expiration of the digital certificate effectively is provided.

BRIEF DESCRIPTION OF THE ACCOMPANYING DRAWINGS

FIG. 1 is a schematic block diagram showing a configuration of a communication system according to a first embodiment.

FIG. 11A illustrates a schematic view showing a server certificate creation screen, and FIG. 11B illustrates a schematic view showing a server certificate saving screen.

FIG. 12A illustrates a schematic view showing a client certificate creation screen, and FIG. 12B illustrates a schematic view showing a client certificate saving screen.

FIG. 13 illustrates a schematic view showing an administrator setting screen.

DETAILED DESCRIPTION

General Overview

Figure 2A:
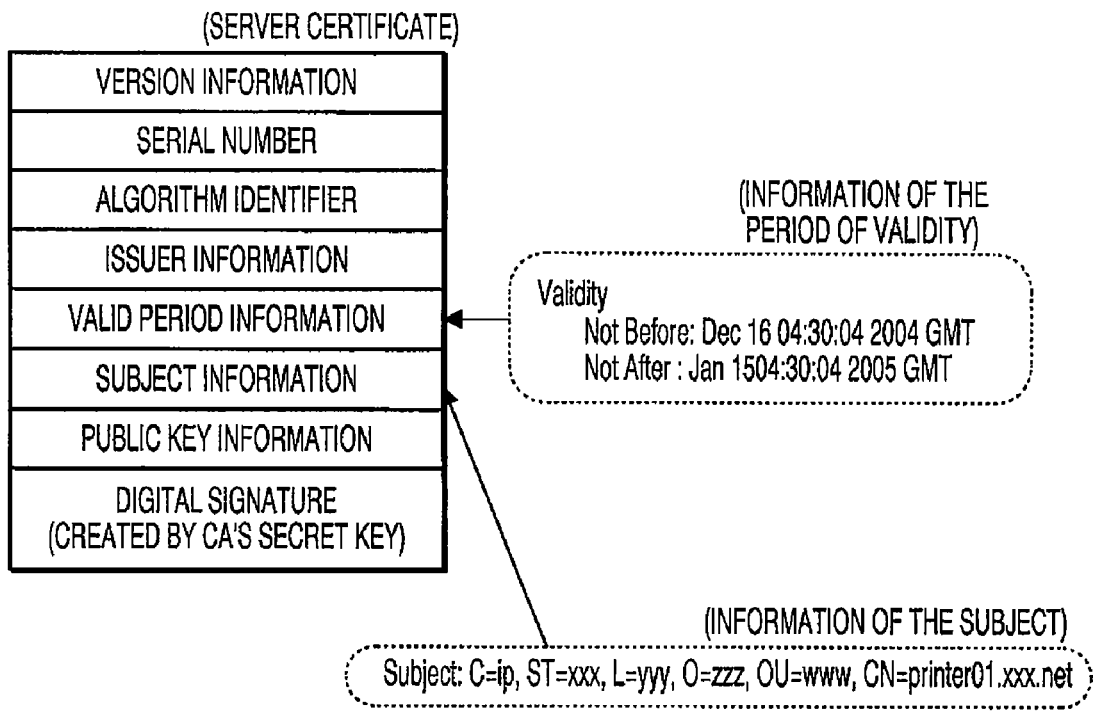
FIGS. 2A and 2B are schematic diagrams showing configurations of digital certificates to be used for the communication system.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided a management apparatus for managing a digital certificate which is written with a period of validity. The management apparatus comprises a transmission condition judgment unit which refers to a target digital certificate and judges whether a predetermined transmission condition is satisfied based on a period of validity written in the target digital certificate, a mail generating unit which generates an e-mail provided with link information to a web page where updating operation on the target digital certificate is acceptable if the predetermined transmission condition is judged as satisfied by the transmission condition judgment unit, a destination setting unit which sets an destination e-mail address of the e-mail generated by the mail generating unit, and a mail transmission unit which transmits the e-mail generated by the mail generating unit to the destination e-mail address set by the destination setting unit.

According to the management apparatus configured as above, an e-mail provided with link information to the web page where updating operation on the digital certificate is acceptable can be transmitted to a user such as the owner of the digital certificate, that allows a user to carry out the updating operation on the digital certificate easily. Therefore, workload concerning the updating operation of the digital certificate will be reduced so that expiration of the digital certificate may be prevented effectively.

In this regard, the target digital certificate may include, a digital certificate for the management apparatus itself to use in communication, and a digital certificate which the management apparatus receives from other apparatuses in communication. And the management apparatus may be incorporated in a digital MFP having a communication function, in this case, the digital certificate of the managed object may include a digital certificate of this MFP that is for the digital MFP to use in communication, and a digital certificate which the digital MFP receives from other apparatuses in communication.

Also, a destination of the e-mail which is provided with link information to the web page where updating operation on the digital certificate may include the e-mail address of the owner of the digital certificate. A transmission condition may be determined based on the remaining time to the period of validity written in the digital certificate as described below.

In at least one aspect, the transmission condition judgment unit is configured such that the predetermined transmission condition is judged as satisfied if the remaining time to the period of validity written in the digital certificate is less than or equal to a predetermined threshold.

The management apparatus configured as above, when the period of validity of digital certificate is getting close, transmits an e-mail that allows to prompt the user of the e-mail destination easily to carry out updating operation of the digital certificate, so that expiration of the digital certificate may be prevented more effectively.

However, in the case that the management apparatus is provided with a function of viewing digital certificate, transmission condition judgment unit may be configured as follows.

In at least one aspect, the management apparatus further comprises a certificate displaying unit which displays information relating to the target digital certificate responding to a viewing request signal inputted through an interface from a user. In this case, the transmission condition judgment unit is configured to judge whether the predetermined transmission condition is satisfied based on the elapsed time from the last displaying time of information relating to the target digital certificate by the certificate displaying unit and the period of validity written in the target digital certificate.

According to the management apparatus configured as above, transmission of the e-mail can be switched between "to transmit" and "not to transmit" depending on the digital certificate viewing situation of the user, so that transmission of the e-mail can be withheld to a user having low-potential of expiration of the digital certificate occurrence. In other words, according to the management apparatus, transmission of aforementioned e-mail can be switched between "to transmit" and "not to transmit" depending on the user's characteristics including personality thereof.

In order to judge whether the predetermined transmission condition is satisfied based on the elapsed time from the last displaying time of information relating to the digital certificate of the managed object, the transmission condition judgment system may be configured specifically as described below.

In at least one aspect, the transmission condition judgment unit is configured that the predetermined transmission condition is judged as satisfied if the remaining time to the period of validity written in the digital certificate is less than or equal to a predetermined threshold and the elapsed time is over the predetermined criterion time; while the predetermined transmission condition is judged as not satisfied in other cases.

According to the management apparatus configured as above, in the case the elapsed time from the last displaying time of the information relating to the digital certificate by the certificate displaying unit is within a criterion time, the e-mail is not to be transmitted, that allows to prevent annoying users by the e-mail which is delivered regardless of the user who already checked information relating to the digital certificate.

In at least one aspect, the target digital certificate is written with an e-mail address of an owner of the digital certificate. The destination setting unit sets the e-mail address of the owner which is written in the target digital certificate as the destination e-mail address if the predetermined transmission condition is judged as satisfied by the transmission condition judgment unit.

According to the management apparatus configured as above, destination of the e-mail can be set by each digital certificate easily, therefore, each e-mail can be transmitted to the user properly.

According to another aspect of the invention, there is provided a management apparatus for managing a digital certificate which is written with a period of validity. The management apparatus comprises an update condition judgment unit which refers to a target digital certificate and judges whether a predetermined update condition is satisfied based on a period of validity written in the target digital certificate, a certificate updating unit which updates the target digital certificate if the predetermined update condition is judged as satisfied by the update condition judgment unit, a mail generating unit which generates an e-mail attached with the updated digital certificate when the target digital certificate is updated by the certificate updating unit, a destination setting unit which sets an destination e-mail address of the e-mail generated by the mail generating unit, and a mail transmission unit which transmits the e-mail generated by the mail generating unit to the destination e-mail address set by the destination setting unit.

According to the management apparatus, a certificate updating unit updates (creates a digital certificate in which the period of validity is updated) the target digital certificate in the case the update condition is judged as satisfied; and transmits the e-mail attached with the updated digital certificate to a user such as the owner; so that the e-mail receiving side can use the updated digital certificate in communication by importing the digital certificate attached to the e-mail into software such as a browser. Therefore, workload concerning the updating operation of the digital certificate will be reduced so that expiration of the digital certificate may be prevented effectively.

In at least one aspect, the target digital certificate is written with an e-mail address of an owner of the target digital certificate; and the destination setting unit sets the e-mail address of the owner which is written in the updated target digital certificate as the destination e-mail address when the target digital certificate is updated by the certificate updating unit.

According to the management apparatus configured above, destination of the e-mail can be set by each digital certificate easily, therefore, each e-mail can be transmitted to the user properly.

According to another aspect of the invention, there is provided a computer readable medium having computer readable instructions stored thereon, which, when executed by a computer functioning as a management apparatus for managing a digital certificate which is written with a period of validity, are configured to judge whether a predetermined transmission condition is satisfied based on a period of validity written in a target digital certificate, to generate an e-mail provided with link information to a web page where updating operation on the target digital certificate is acceptable if the predetermined transmission condition is judged as satisfied; to set an destination e-mail address of the generated e-mail; and to transmit the e-mail to the destination e-mail address.

With this configuration, workload concerning the updating operation of the digital certificate will be reduced so that expiration of the digital certificate may be prevented effectively.

According to another aspect of the invention, there is provided a computer readable medium having computer readable instructions stored thereon, which, when executed by a computer functioning as a management apparatus for managing a digital certificate which is written with a period of validity, are configured to judge whether a predetermined update condition is satisfied based on a period of validity written in a target digital certificate, to update the target digital certificate if the predetermined update condition is judged as satisfied, to generate an e-mail attached with the updated digital certificate if the target digital certificate is updated, to set an destination e-mail address of the generated e-mail, and to transmit the e-mail to the destination e-mail address.

With this configuration, workload concerning the updating operation of the digital certificate will be reduced so that expiration of the digital certificate may be prevented effectively.

EMBODIMENT

Hereinafter, referring to accompanying drawings, embodiments of the present invention will be described.

First Embodiment

FIG. 1 is a schematic block diagram showing a configuration of the communication system 1 according to a first embodiment. As shown in FIG. 1, the communication system 1 according to the first embodiment is configured with a mail server 3, a digital MFP (Multiple Function Peripheral) 10, and personal computer(s) (hereinafter simply referred to as "PC") 30 which are connected to TCP/IP network.

The MFP 10 is provided with a CPU 11, a RAM 12 as a working memory, a flash memory 13 which is stored with various programs and data, a communication I/F 15 which is connected to TCP/IP network, a printing unit 17 which forms images on paper using a laser printing method or a ink-jet printing method, a scanning unit 19 which reads a document placed on a platen optically and generates image data, and a displaying and operating unit 21 as a user I/F which is provided with various keys operable for users and a display unit, and the various programs are executed by the CPU 11 so that the MFP 10 achieves various functions including a printing function, a scanning function, and a copying function.

For example, upon receiving print data from an external PC 30 through the communication I/F 15, the CPU 11 forms printing images on paper based on the print data by controlling the printing unit 17 (printing function). And, when a read command is inputted on the displaying and operating unit 21 by an operation of a user through the displaying and operating unit 21, the CPU 11 generates image data which indicates the scanned image of the document placed on the platen, and transmits it to the predetermined PC 30 through the communication I/F 15 (scanning function).

The MFP 10 has a web server function, a SSL (Secure Socket Layer) communication function, and a function as a certificate authority (CA), and stores self-signed server certificate and a server secret key which are issued from the MFP 10 itself, and a CA certificate for client certificate verification, in a flash memory 13. The CA certificate for client certificate verification is for verifying the client certificate signed with the server secret key, which is identical with the server certificate.

Further, the MFP 10 is configured to authenticate the client (the PC 30) by a digital certificate or a password at the acceptance of an access from the PC 30 through a specific port, and stores a password in the flash memory 13 for client authentication. Moreover, the MFP 10 has a function to transmit an e-mail to the administrator when the period of validity of the server certificate is getting close, and stores an e-mail address of the administrator which is set as the destination of the e-mail (e-mail address of the administrator). Furthermore, the MFP 10 has configuration information about the last viewing time of the server certificate and the operation mode of SSL communication information (hereinafter referred to as "mode configuration information") in the flash memory 13 (as will hereinafter be described in detail).

Figure 2B:
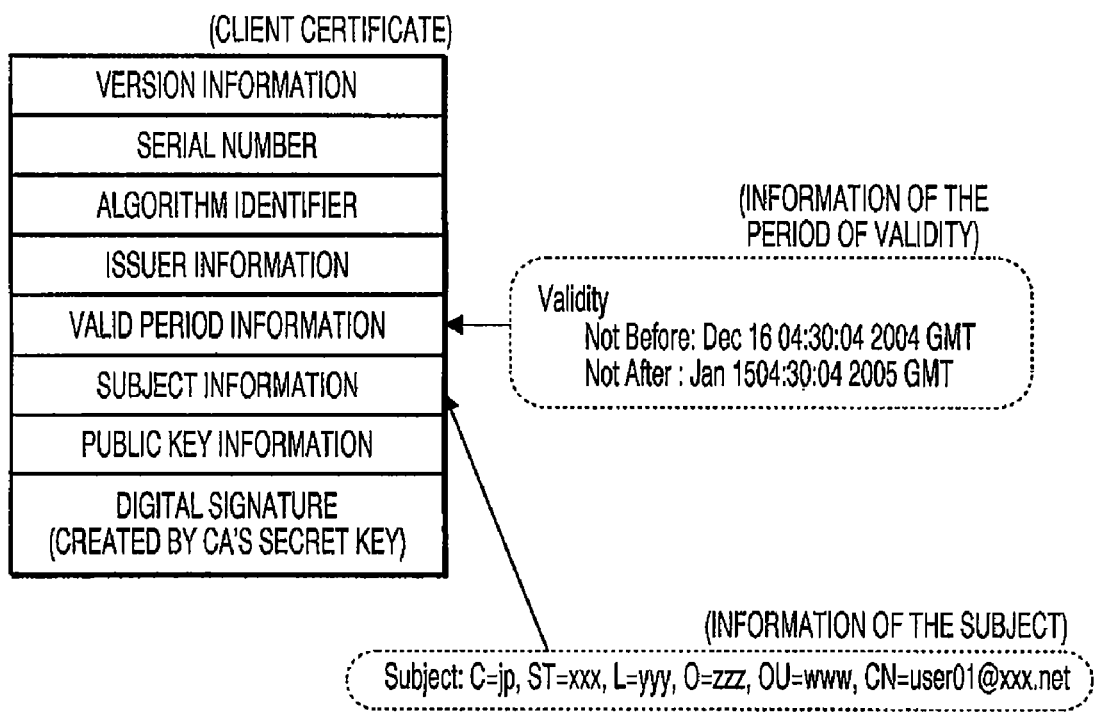

FIGS. 2A 2B are schematic diagrams showing configurations of digital certificates to be used for the communication system 1 according to the embodiment. Specifically, FIG. 2A is a schematic diagram showing configuration of the server certificate which is stored in the flash memory 13 of the MFP 10, and FIG. 2B is a schematic diagram showing configuration of the client certificate which is issued together with a client secret key from the MFP 10 and registered into the PC 30.

The server certificate which is managed in the SSL communication of the communication system 1 according to the embodiment is configured, as shown in FIG. 2A, to contain version information which indicates the version of the certificate, a serial number of the certificate, an algorithm identifier, issuer information which indicates the certificate issuer who signed the digital signature, a valid period information which indicates information of the period of validity of the certificate, subject information which indicates information of the owner of the certificate, public key information which indicates a public key of the owner, and digital signature information which indicates the value (symbols) of the digital signature. Therein, the subject information in the server certificate contains a FQDN (Full Qualified Domain Name) of the MFP 10, and the valid period information is configured to indicate the commencement time and the expiration time of the valid period of the certificate (the period of validity).

On the other hand, the client certificate is configured, as shown in FIG. 2B, to contain basically same sort of information as the server certificate, and to contain additionally information of an e-mail address of the owner (the e-mail address to be used by the main user of the PC 30) as the subject information.

Figure 3A:
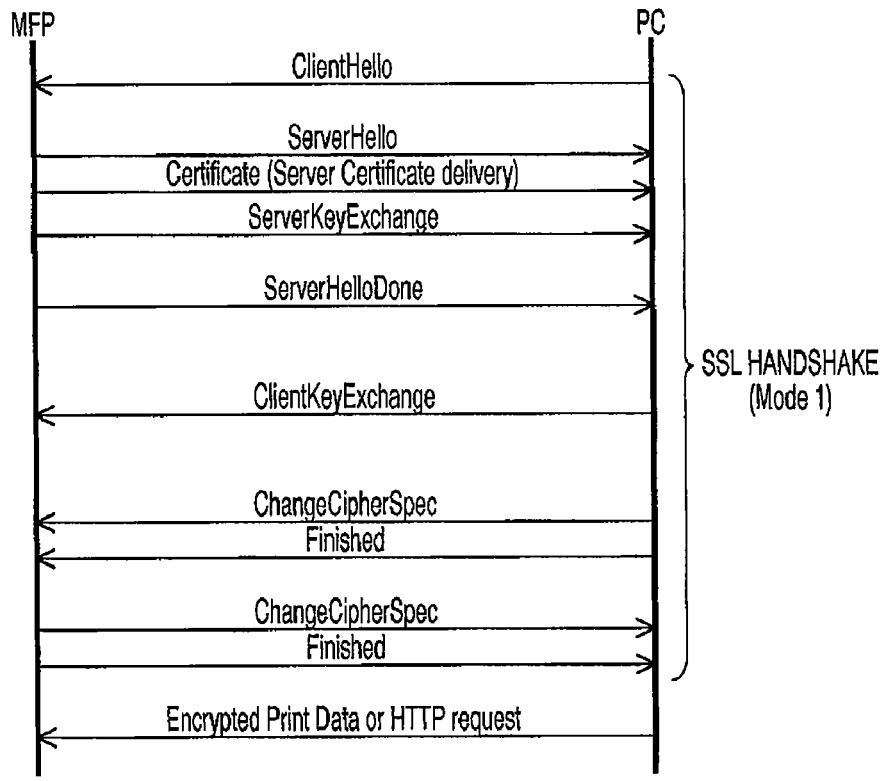
FIGS. 3A and 3B are rudder charts showing steps in SSL handshake.
Figure 3B:
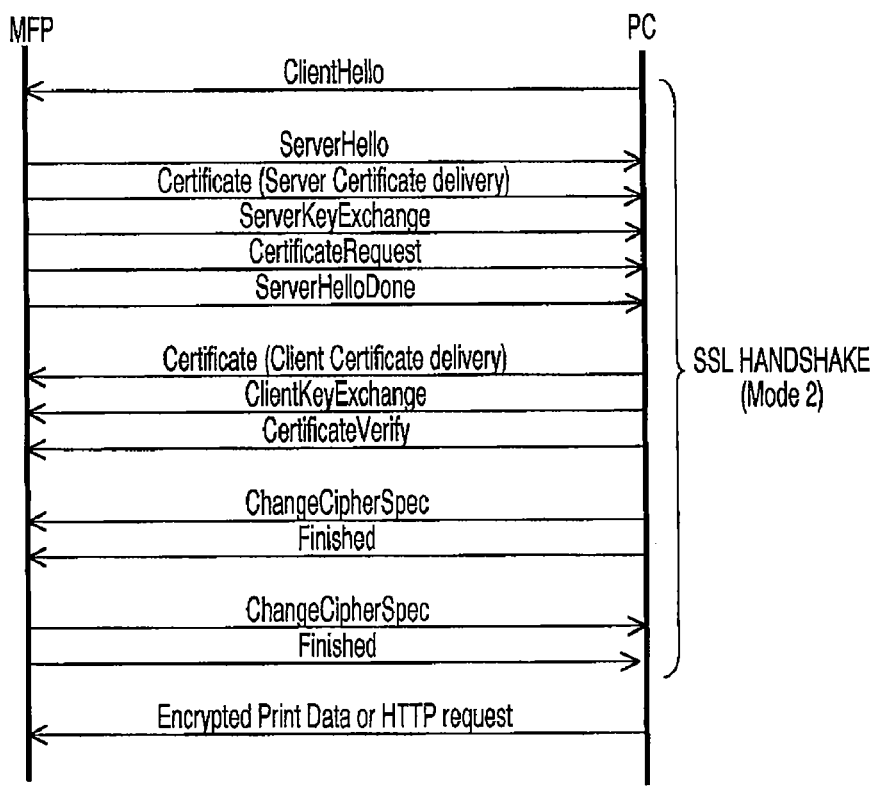

The server certificate stored in the MFP 10 is to be provided to destination PC(s) 30 in the steps shown in FIG. 3 at the SSL communication. FIGS. 3A and 3B are rudder charts showing steps in SSL handshake. Specifically, FIG. 3A is a rudder chart showing the steps of SSL handshake in the case of not requesting the client certificate (hereinafter referred to as "Mode 1"), and FIG. 3B is a rudder chart showing steps in SSL handshake in the case of requesting the client certificate.

As shown in FIGS. 3A and 3B, SSL handshake is started by transmitting a ClientHello message from the PC 30 (client) to the MFP 10 (server). By this transmitting of the ClientHello message, the start of communication is to be notified to the MFP 10, and necessary information for the MFP 10 to communicate with PC 30 using SSL is to be also notified.

Upon receiving the ClientHello message, the MFP 10 responds with a ServerHello message which contains necessary information for the PC 30 to communicate with the MFP 10 itself using SSL to the PC 30, and transmits a Certificate message which contains the server certificate to the PC 30. Also, the MFP 10 transmits a ServerKeyExchange message to the PC 30 as necessary.

If the mode of SSL communication is set in "Mode 2", the MFP 10 transmits a CertificateRequest message for requesting the client certificate to the PC 30 (see FIG. 3B). Thus, when transmission of these messages is completed, the MFP 10 is to transmit a ServerHelloDone message which indicates termination of the message transmission sequence to the PC 3.

On the other hand, upon receiving the ServerHelloDone message, if the PC 30 has already received the CertificateRequest message in advance, the PC 30 transmits a Certificate message which contains its own client certificate to the MFP 10 in responding to the request, and also transmits a ClientKeyExchange message which contains a premaster-secret necessary for generating a session key to the MFP 10. In this regard, at the transmission of the ClientKeyExchange message, the PC 30 encrypts the message by the notified server public key and transmits it. And also, the PC 30 transmits a CertificateVerify message.

Contrary, upon receiving the ServerHelloDone message without having been receiving the CertificateRequest message, the PC 30 transmits only ClientKeyExchange message without transmitting aforementioned Certificate message and CertificateVerify message to the MFP 10.

When this step is completed, the PC 30 is to transmit a ChangeCipherSpec message which notifies change of ciphers to the MFP 10, and also transmits a Finished message which notifies termination of the encrypted handshake using the session key to the MFP 10.

On the other hand, upon receiving the Finished message from the PC 30, the MFP 10 is to transmit the ChangeCipherSpec message which notifies change of ciphers to the PC 30, and also transmits a Finished message which notifies termination of the encrypted handshake using the session key to the PC 30. Thus the server certificate and the client certificate are transmitted and received between the MFP 10 and the PC 30 of the embodiment so that the SSL communication is to be achieved.

Besides, the PC 30 according to the embodiment is configured similarly to a general personal computer, and the SSL communication and other functions are achieved in the CPU 31 by executing various programs. Specifically, the PC 30 is provided with a CPU 31, a RAM 32 as a working memory, a ROM 33 which is stored with various programs including a boot program, a hard disk drive (HDD) 43, a communication I/F 35 which is connected to TCP/IP network, an operating unit 37 which includes various devices such as a keyboard and a pointing device, and a display unit 39 which includes a display instrument such as LCD monitor.

The PC 30 stores a CA certificate for server certificate verification, its own client certificate and a client secret key which were issued from the MFP 10, and a password for submitting to the MFP 10 at the client authentication, herewith, at the SSL communication, authenticates the server certificate using the CA certificate stored in the HDD 34 and transmits its own client certificate to the MFP 10 as necessary. Also, if the SSL handshake was executed in "Mode 1", the PC 30 is to accept the client authentication steps by transmitting the password stored in the HDD 34 to the MFP 10.

Specifically, the PC 30 has a browser which is the software to utilize the web server function of the MFP 10 and a printer driver to utilize the printing function of the MFP 10, in the HDD 34, and the SSL communication is used by the browser and the printer driver.

Figure 4:
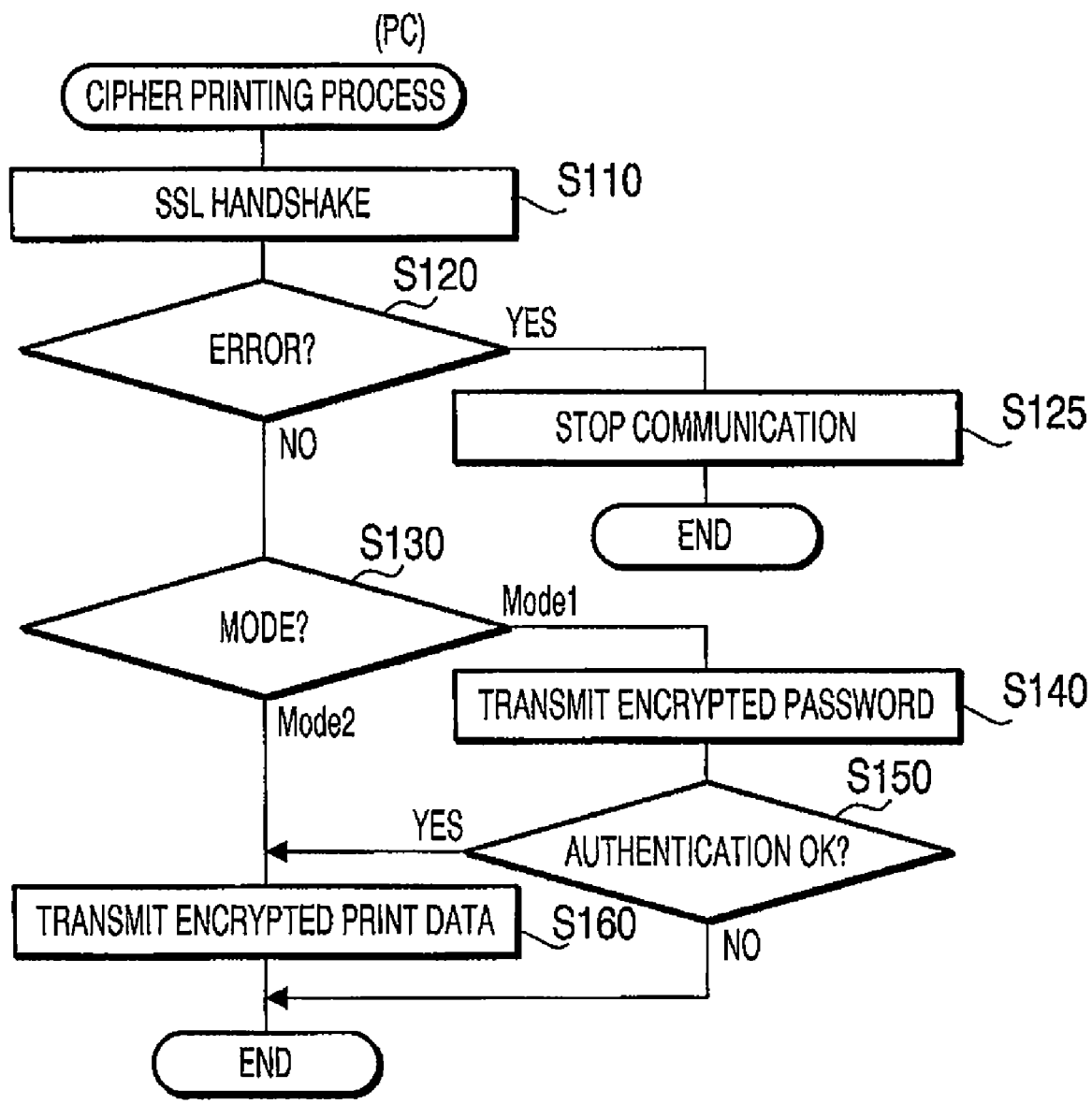
FIG. 4 is a flowchart showing a cipher printing process to be executed by a PC in the communication system.

FIG. 4 is a flowchart showing a cipher printing process to be executed by the CPU 31 in the PC 30 based on the printer driver when a cipher print command is inputted by an operation of a user through the operating unit 37.

At the start of the cipher printing process, the CPU 31 executes the SSL handshake with the MFP 10 in the methods described above (S100). If the CPU 31 was successful in the SSL handshake, judges as NO in the step S120, and control proceeds to the step S130. On the other hand, if the CPU 31 was unsuccessful in the SSL handshake, the CPU 31 judges as YES in the step S120 and stops communication with the MFP 10 (S125), then terminates the cipher printing process. In this regard, at the time of cipher printing process, the CPU 31 accesses a port for cipher printing of the MFP 10.

In the step S130, the CPU 31 judges in which mode the SSL handshake was executed between "Mode 1" and "Mode 2", and if it is judged that the SSL handshake was executed in "Mode 1", the CPU 31 encrypts the password which is stored in the HDD 34 and transmits it to the MFP 10 (S140).

After the end of the step, the CPU 31 judges whether the client authentication based on the transmitted password was successful in the MFP 10 (S150). If the authentication in the MFP 10 is judged as successful (S150: YES), control proceeds to the step S160 where the CPU 31 encrypts print data which was designated by the cipher print command and transmits it. And then the cipher printing process is to be terminated. On the other hand, if the authentication in the MFP 10 is judged as unsuccessful, (S150: NO), the cipher printing process is to be terminated without transmitting print data.

If it is judged in step S130 that the SSL handshake was executed in "Mode 2", control proceeds to the step S160 without transmitting aforementioned password, and the CPU 31 encrypts print data which was designated by the cipher print command and transmits it (S160). And then the cipher printing process is to be terminated. Thus, the CPU 31 encrypts print data and transmits it by SSL communication so that information having high confidentiality of the print data is not to be leaked from the network, and operates the MFP 10 to form printing images on paper based on this print data.

Figure 5:
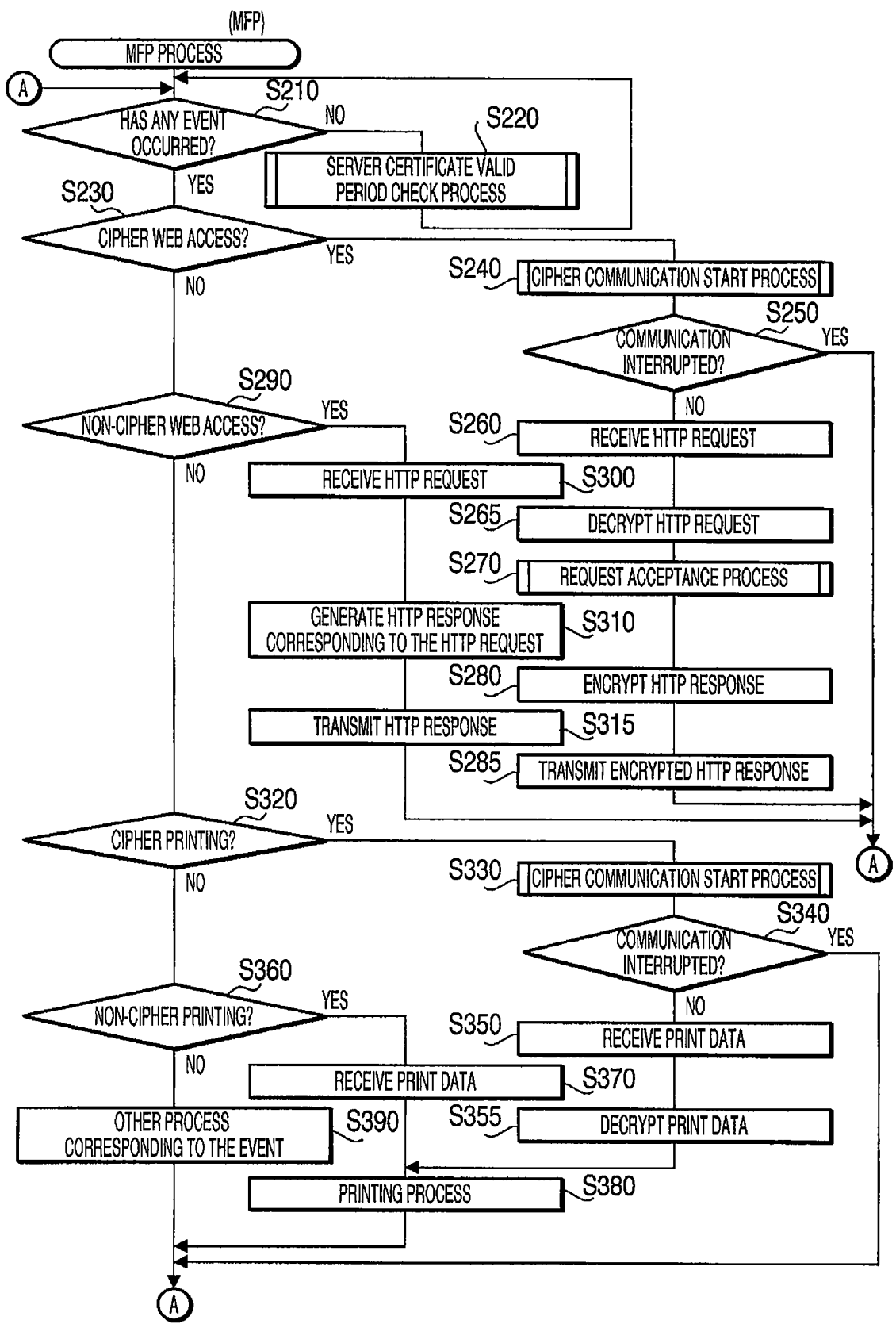
FIG. 5 is a flowchart showing a MFP process to be executed by a MFP (multifunction peripheral) in the communication system.

By executing a MFP process shown in FIG. 5, the MFP 10 accepts the print data which is transmitted in the cipher printing process mentioned above, and also accepts various types of web access. Herein, FIG. 5 is a flowchart showing a MFP process that the CPU 11 in the MFP 10 starts executing at the activation.

Figure 6:
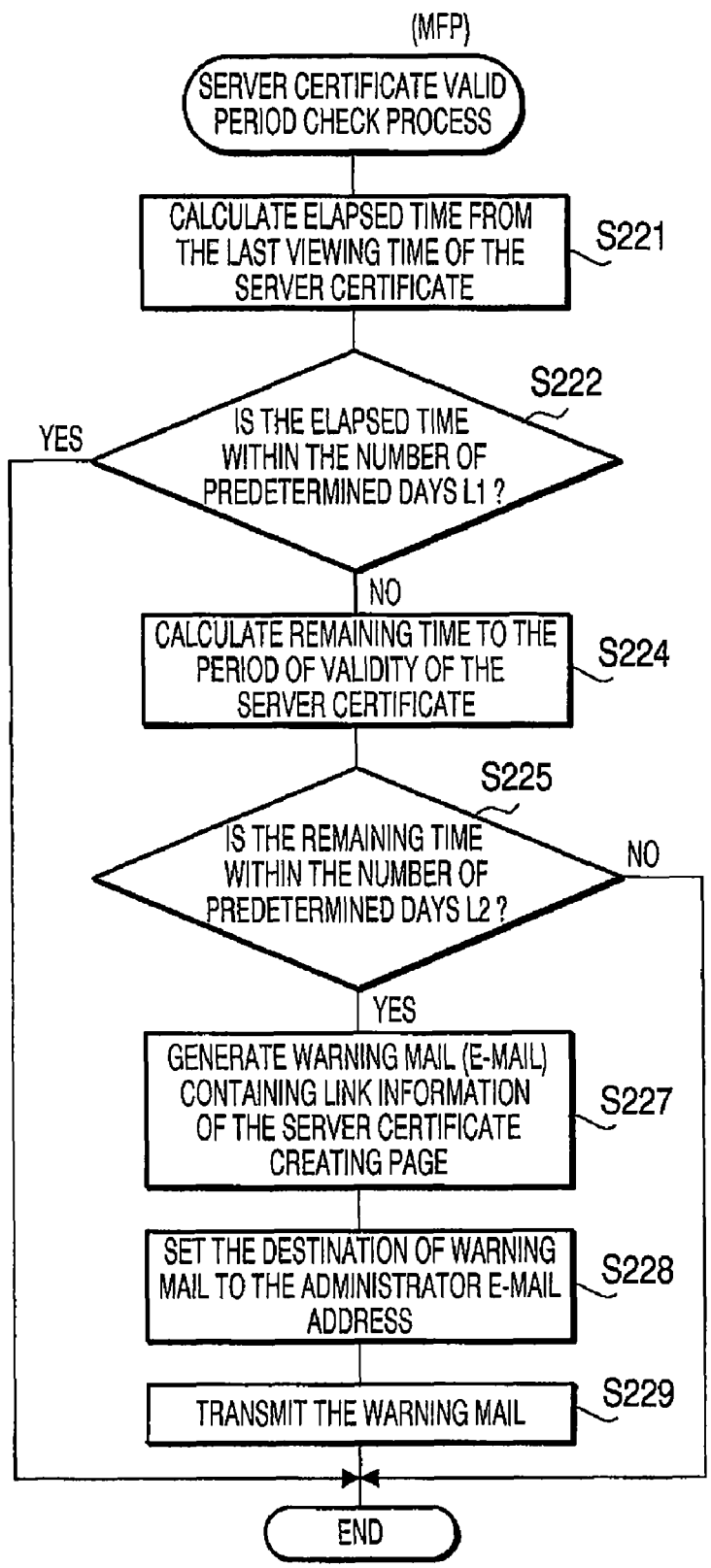
FIG. 6 is a flowchart showing a server certificate valid period check process to be executed by the MFP.

At the start of the MFP process, the CPU 11 judges if any event has occurred such as an access to the HTTPS port (cipher web access), an access to the HTTP port (non-cipher web access), an access to the port for cipher printing, and an access to the port for non-cipher printing (S210). If it is judged that an event has occurred (S210: YES), control proceeds to the step S230. If it is judged that no event has occurred (S210: NO), control proceeds to the step S220 where the CPU 11 executes a server certificate valid period check process shown in FIG. 6. Herein, FIG. 6 is a flowchart showing a server certificate valid period check process to be executed by the CPU 11.

At the start of the server certificate valid period check process, the CPU 11 calculates elapsed time from the time the server certificate was checked by the administrator based on the last viewing time of the server certificate which is stored in the flash memory 13. Specifically, difference between the current time and the last viewing time is calculated as the elapsed time (S221). Then, after the end of the step, control proceeds to the step S222 where the CPU 11 judges whether the calculated elapsed time mentioned above is within the number of predetermined days L1. If the elapsed time is judged to be within the number of predetermined days L1 (S222: YES), the server certificate valid period check process is to be terminated without executing the steps S224-S229.

On the other hand, if the elapsed time is judged to be over the number of predetermined days L1 (S222: NO), the CPU 11 calculates remaining time to the period of validity (time to expiration) of its own server certificate which is stored in the flash memory 13 (S224). To put it plainly, difference between the expiration time of the valid period which is indicated by valid period information of the server certificate and the current time is calculated.

Then, after the end of the step, the CPU 11 judges whether the remaining time mentioned above is within the number of predetermined days L2 (S225), and if the remaining time is judged to be within the number of predetermined days L2 (S225: YES), control proceeds to the step S227. If the remaining time is judged to be over the number of predetermined days L2 (S225: NO), the server certificate valid period check process is to be terminated without executing the steps S227-S229.

On the other hand, if the process progressed to the step S227, the CPU 11 creates an e-mail (hereinafter referred to as "warning mail") which is written with link information of the server certificate creating page (see FIG. 11A) which its own MFP 10 may provide through the web server function and is written with a message to notify that the period of validity of the server certificate is getting close, then sets the destination of the warning mail to the administrator e-mail address which is stored in the flash memory 13 (S228). After the end of the step, by transmitting aforementioned warning mail to the mail server 3, the warning mail is to be transmitted to the administrator through the mail server 3 (S229). And then, the server certificate valid period check process is to be terminated.

Figure 7:
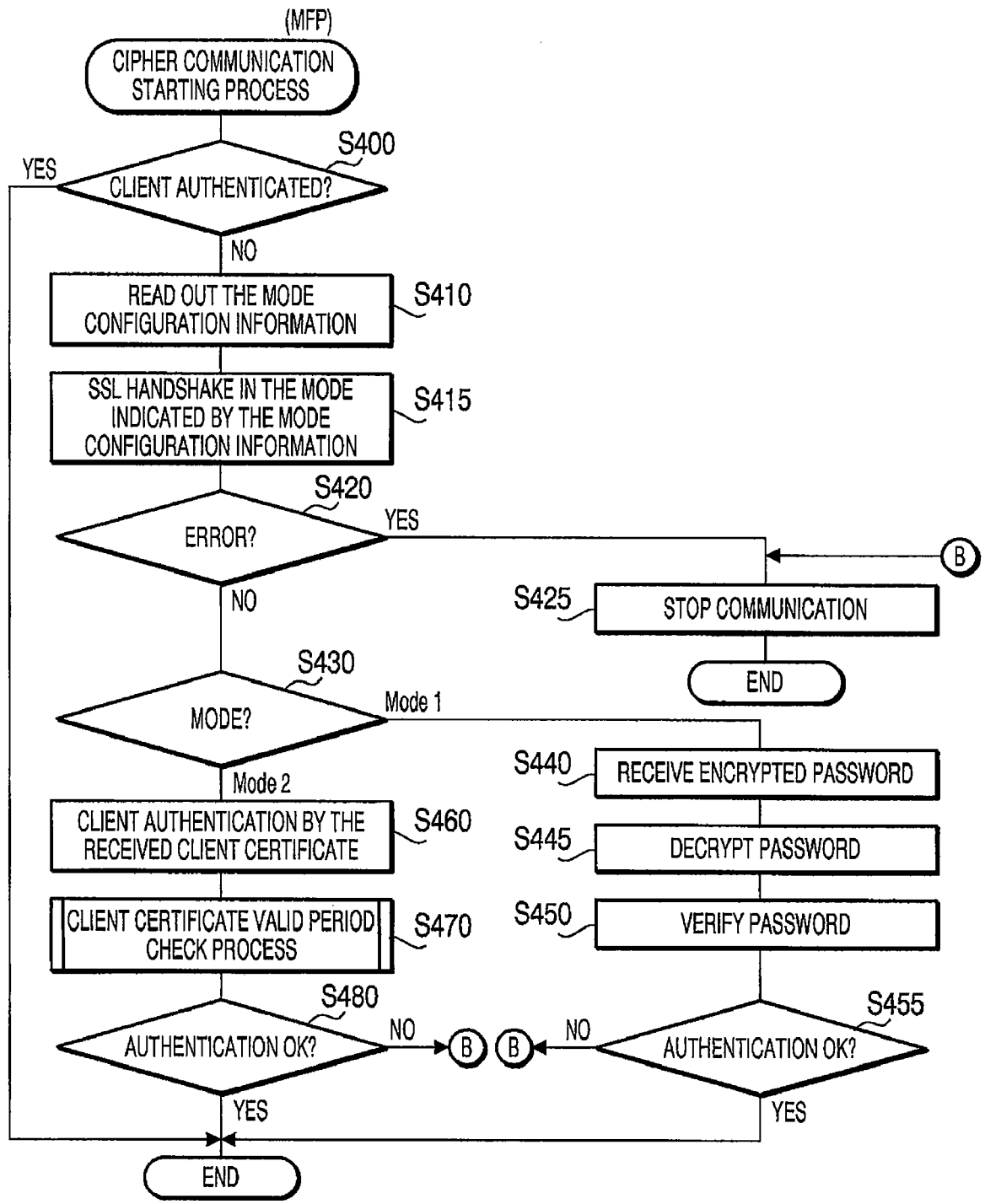
FIG. 7 is a flowchart showing a cipher communication start process to be executed by the MFP.

Therefore, after the end of the server certificate valid period check process in the step S220, control proceeds to the step S210. There, if aforementioned event has occurred, control proceeds to the step S230 where the CPU 11 judges whether the occurred event is cipher web access. If it is judged that the occurred event is cipher web access (S230: YES), thus the CPU 11 executes a cipher communication start process shown in FIG. 7 (S240). Herein, FIG. 7 is a flowchart showing a cipher communication start process to be executed by the CPU 11.

At the start of the cipher communication starting process, the CPU 11 judges whether the web access of the current time is a valid web access from the PC 30 that has been already authenticated successfully in the cipher communication starting process (S400), and if the web access is judged as the valid web access from the PC 30 which has been authenticated successfully (S400: YES), the cipher communication starting process is to be terminated. On the other hand, if the web access is judged as not the valid web access from the PC 30 which has not been authenticated successfully (S400: NO), the CPU 11 reads out the mode configuration information from the flash memory 13 (S410), and executes SSL handshake based on the mode which is indicated by the mode configuration information ("Mode 1" or "Mode 2" shown in FIG. 3) (S415).

If it was successful in the SSL handshake, the CPU 11 judges as NO in the step S420, and control proceeds to the step S430. On the other hand, if it was unsuccessful in the SSL handshake, the CPU 11 judges as YES in the step S420, and stops communication with the access source PC 30 (S425), then terminates this cipher communication starting process.

If it was successful in the SSL handshake and the process progressed to the step S430, the CPU 11 judges in which mode the SSL handshake was executed between "Mode 1" and "Mode 2", and if it is judged that the SSL handshake was executed in "Mode 1", the CPU 11 receives the password which was transmitted in the step S140 from the access source PC 30 (S440), and decrypts the received password (S445).

And the CPU 11 verifies the decrypted password with the password stored in the flash memory 13 (S450), and if both of the passwords were matched successfully in the client (the PC 30) identification, the CPU 11 judges it as successful in the client (the PC 30) authentication (S455: YES), and terminates the cipher communication starting process without stopping communication. On the other hand, if both of the passwords were unmatched, the CPU 11 judges it as unsuccessful in the client authentication (S455: NO), and stops communication with the access source (S425), then terminates this cipher communication starting process.

Figure 8:
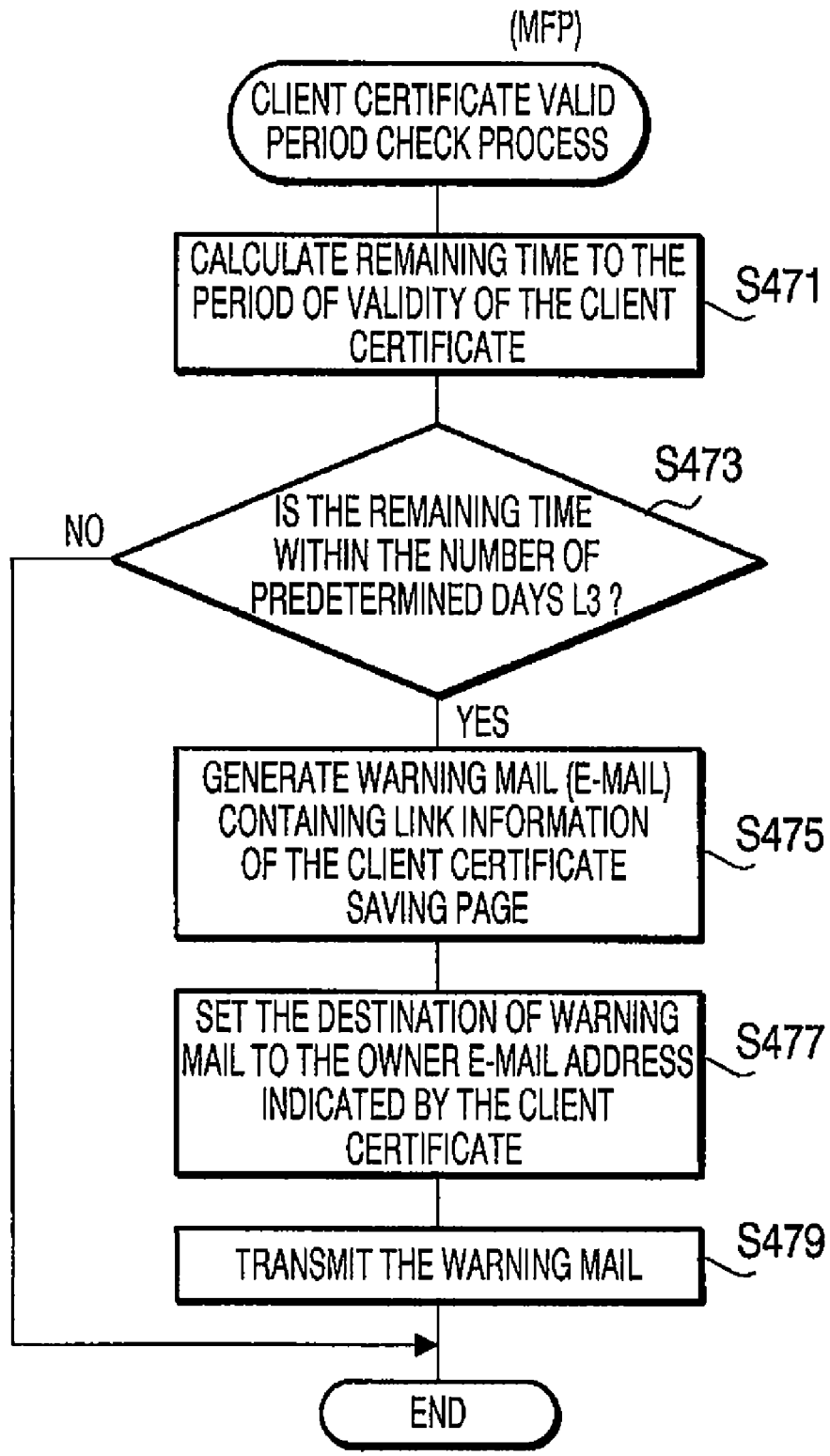
FIG. 8 is a flowchart showing a client certificate valid period check process to be executed by the MFP.

If it is judged in step S430 that the SSL handshake was executed in "Mode 2", the CPU 11 identifies the client of the access source (the PC 30) by the received client certificate (S460). Then, after the end of the step, the CPU 11 executes a client certificate valid period check process shown in FIG. 8 (S470). Herein, FIG. 8 is a flowchart showing a client certificate valid period check process to be executed by the CPU 11.

At the start of the client certificate valid period check process, the CPU 11 calculates remaining time (time to expiration) to the period of validity (expiration date and time of effective term) of the received client certificate (S471), and judges whether the remaining time is within the number of predetermined days L3 (S473). And if the remaining time is judged to be within the number of predetermined days L3 (S473: YES), control proceeds to the step S475. If the remaining time is judged to be over the number of predetermined days L3 (S473: NO), the client certificate valid period check process is to be terminated without executing the steps S475-S479.

On the other hand, if the process progressed to the step S475, the CPU 11 creates an e-mail (warning mail) which is written with link information of the client certificate saving page (see FIG. 12B) (which is acceptable of updating operation of the client certificate) and is written with a message to notify that the period of validity of the client certificate is getting close, and then sets the destination of the warning mail to an e-mail address which is indicated by the subject information of the client certificate (S477). After the end of the step, by transmitting aforementioned warning mail to the mail server 3, the warning mail is to be transmitted to an e-mail address which is used by the main user of the access source PC 30 through the mail server 3 (S479). Then, the client certificate valid period check process is to be terminated.

After the end of the client certificate valid period check process in the step S470, control proceeds to the step S480. If it was successful in the client (the PC 30) identification in the step S460, the CPU 11 judges it as successful in the client (the PC 30) authentication (S480: YES), and terminates the cipher communication starting process without stopping communication. If it was not successful in the client (the PC 30) identification, the CPU 11 judges it as unsuccessful in the client authentication (S480: NO), and stops communication with the access source (S425), then terminates the cipher communication starting process.

Referring back to FIG. 5, after the end of the cipher communication starting process in the step S240, control proceeds to the step S250 where the CPU 11 judges whether communication was interrupted in the previous cipher communication starting process. And if it is judged that the communication was interrupted (S250: YES), control proceeds to the step S210. If it is judged that the communication was not interrupted (S250: NO), the CPU 11 receives a valid HTTP request from the PC 30 that has been already authenticated successfully (S260), and decrypts the received HTTP request (S265).

Figure 9:
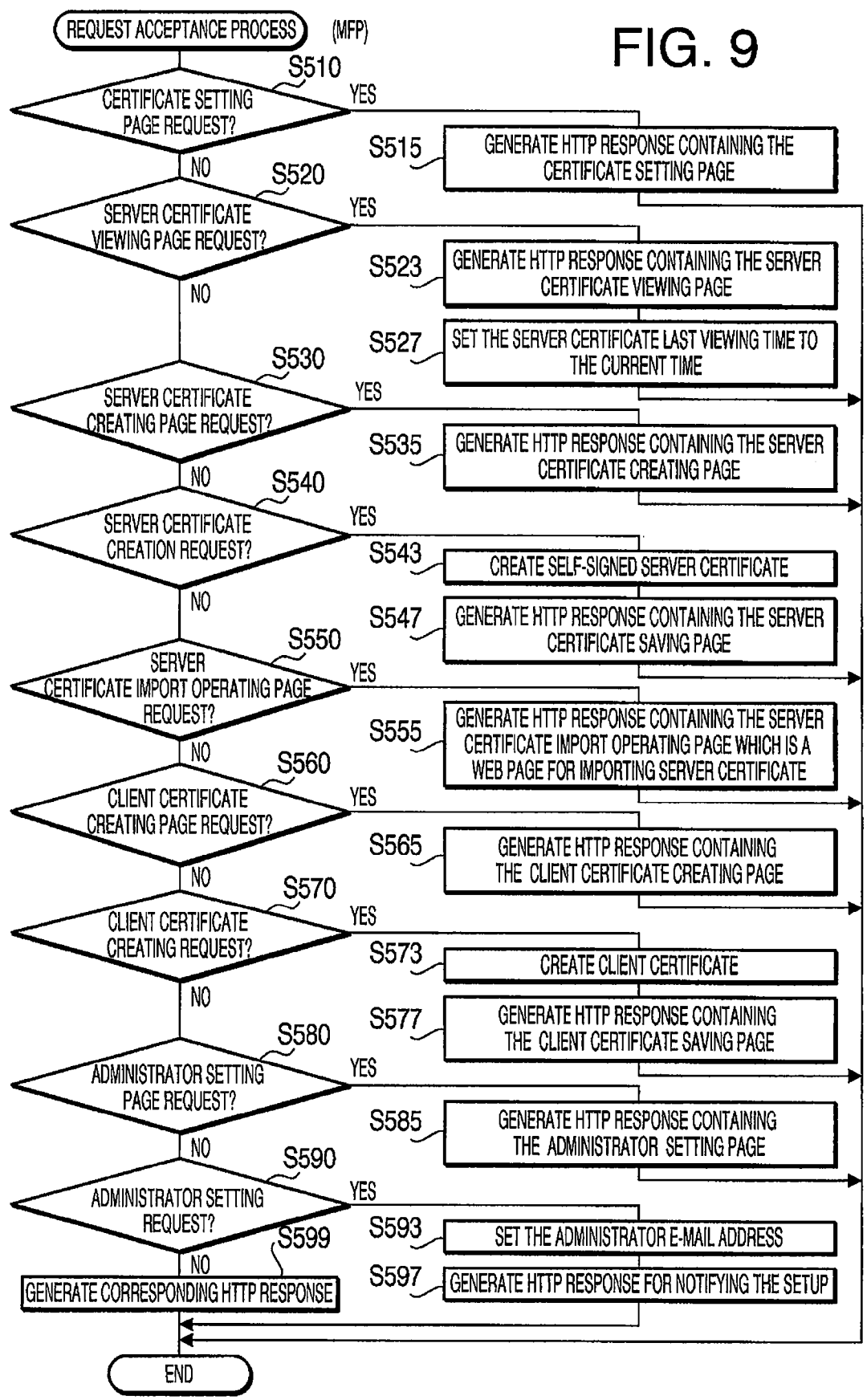
FIG. 9 is a flowchart showing a request acceptance process to be executed by the MFP.

After the end of the step, the CPU 11 executes a request acceptance process in the step S270, and generates a HTTP response corresponding to the HTTP request as shown in FIG. 9. And then, the CPU 11 encrypts the HTTP response which was generated in the request acceptance process (S280), and transmits the HTTP response to the access source PC 30 (S285). Then, control returns to the step S210.

FIG. 9 is a flowchart showing a request acceptance process to be executed by the CPU 11 of the MFP 10. At the start of the request acceptance process, the CPU 11 judges whether the received HTTP request is the HTTP request for requesting a certificate setting page (S510), and if it is judged as the HTTP request for requesting the certificate setting page (S510: YES), the CPU 11 generates a HTTP response which contains the certificate setting page that is a web page for displaying the certificate setting screen (S515). And then, the request acceptance process is to be terminated.

Figure 10:
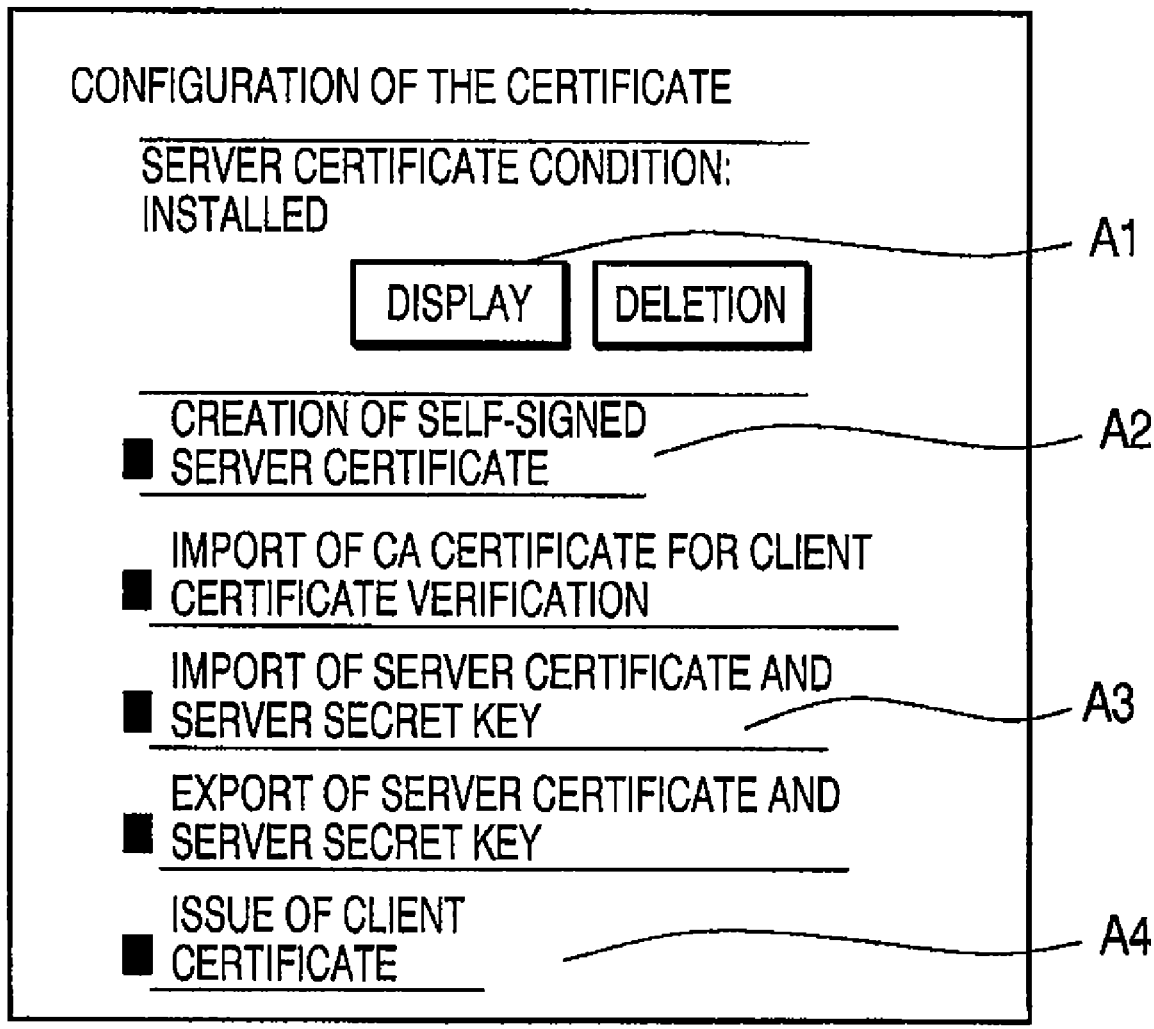
FIG. 10 illustrates a schematic view showing a certificate setting screen.

FIG. 10 illustrates a schematic view showing a certificate setting screen "Configuration of the Certificate". By the transmission of the HTTP response, the certificate setting screen, shown in FIG. 10, is to be displayed on the display unit 39 of access source PC 30. Specifically, the components of the certificate setting screen according to the embodiment include "DISPLAY" button A1 which is provided with a link to a server certificate viewing page, a character string A2 "Creation of Self-signed Server Certificate"which is provided with a link to a server certificate creation page (see FIG. 11A), a character string A3 "Import of Server Certificate and Server Secret Key" which is provided with a link to a server certificate import operating page (not shown in the figure) which is a web page acceptable of the import operation of the server certificate and the server secret key, a character string A4 "Issue of Client Certificate" which is provided with a link to a client certificate creation page (see FIG. 12A).

Specifically, by a user, when a selecting operation on the "DISPLAY" button A1 in the certificate setting screen is executed, an HTTP request for requesting the server certificate viewing page is to be transmitted from the PC 30 to the MFP 10, and when a selecting operation on the character string A2 in the certificate setting screen is executed, an HTTP request for requesting the server certificate creation page is to be transmitted from the PC 30 to the MFP 10. When a selecting operation on the character string A3 in the certificate setting screen is executed, an HTTP request for requesting the server certificate import operating page is to be transmitted from the PC 30 to the MFP 10, and when a selecting operation on the character string A4 in the certificate setting screen is executed, an HTTP request for requesting the client certificate creation page is to be transmitted from the PC 30 to the MFP 10.

If the CPU 11 judges that the received HTTP request is not the HTTP request for requesting the certificate setting page (S510: NO), control proceeds to the step S520 where the CPU 11 judges whether the received HTTP request is the HTTP request for requesting aforementioned server certificate viewing page, and if the received HTTP request is judged as the HTTP request for requesting the server certificate viewing page (S520: YES), control proceeds to the step S523 where the CPU 11 generates the HTTP response which contains the server certificate viewing page that is a web page for displaying the server certificate viewing screen. After the end of the step, control proceeds to the step S527 where the CPU 11 updates the last viewing time of the server certificate which is stored in the flash memory 13 into the current time. And then, the request acceptance process is to be terminated. By the transmission of the HTTP response which contains the server certificate viewing page, the server certificate viewing screen which indicates contents of the server certificate is to be displayed on the PC 30 side (not shown in the figure; the screen is to indicate the server certificate by text).

If the CPU 11 judges that the received HTTP request is not the HTTP request for requesting the server certificate viewing page (S520: NO), the CPU 11 judges whether the received HTTP request is the HTTP request for requesting the server certificate creation page (S530). If the received HTTP request is judged as the HTTP request for requesting the server certificate creation page (S530: YES), the CPU 11 generates the HTTP response which contains the server certificate creation page that is a web page for displaying the server certificate creation screen (S535). And then, the request acceptance process is to be terminated.

FIG. 11A illustrates a schematic view showing a server certificate creation screen. By the transmission of the HTTP response which contains aforementioned server certificate creation page, as shown in FIG. 11A, the server certificate creation screen is to be displayed on the display unit 39 of access source PC 30. Specifically, the components of the server certificate creation screen include a plurality of input objects which are acceptable of input operation on the necessary items for generating the server certificate, and an "OK" button which is capable of transmitting an HTTP request which contains values for respective input objects and that is an HTTP request for requesting creation of the server certificate. Also, as for the input objects, as shown in FIG. 11A, the input objects for setting the period of validity of the server certificate are included.

More specifically, upon pressing the "OK" button of this server certificate creation screen, an HTTP request for requesting creation of the server certificate which contains aforementioned input values for respective input objects is to be transmitted from the PC 30.

If the CPU 11 judges that the received HTTP request is not the HTTP request for requesting the server certificate creation page (S530: NO), control proceeds to the step S540where the CPU 11 judges whether the received HTTP request is aforementioned HTTP request for requesting creation of the server certificate. If the received HTTP request is judged as aforementioned HTTP request for requesting creation of the server certificate (S540: YES), control proceeds to the step S543 where the CPU 11 creates the responding server certificate based on aforementioned values for respective input objects which are indicated by the received HTTP request. In this case, the server certificate is to be generated by signing with a digital signature using its own server secret key. And after the end of the step, the CPU 11 generates an HTTP response which contains the server certificate saving page that is a web page for saving (upload) the server certificate (S547), and terminates this request acceptance process.

FIG. 11B illustrates a schematic view showing a server certificate saving screen which is indicated by the server certificate saving page. By the transmission of the HTTP response which contains aforementioned server certificate saving page, as shown in FIG. 11B, the server certificate saving screen is to be displayed on the display unit 39 of access source PC 30. Specifically, the server certificate saving screen includes an "SAVE IN A FILE"button which is for accepting upload operation of the server certificate. When this button is pressed, the server certificate created in the step S543 is to be uploaded onto the access source PC 30. Besides, at the time of uploading, the server secret key which is corresponding to the server public key indicated by the server certificate is also encrypted and uploaded onto the access source PC 30.

If the CPU 11 judges that the received HTTP request is not the HTTP request for requesting the creation of the server certificate (S540: NO), control proceeds to the step S550 where the CPU 11 judges whether the received HTTP request is the HTTP request for requesting the server certificate import operating page. And if the received HTTP request is judged as the HTTP request for requesting the server certificate import operating page (S550: YES), the CPU 11 generates the HTTP response which contains the server certificate import operating page (S555). And then, the request acceptance process is to be terminated. If import operation of the server certificate and the server secret key is executed in the PC 30 based on the server certificate import operating page, responding to the operation, the CPU 11 downloads the server certificate and the server secret key from the PC 30, and writes them in the flash memory 13, thus, updates the server certificate and the server secret key.

If the CPU 11 judges that the received HTTP request is not the HTTP request for requesting the server certificate import operating page (S550: NO), the CPU 11 judges whether the received HTTP request is the HTTP request for requesting the client certificate creation page (S560). If the received HTTP request is judged as the HTTP request for requesting the client certificate creation page (S560: YES), the CPU 11 generates an HTTP response which contains the client certificate creation page that is a web page for displaying the client certificate creation screen (S565). And then, the request acceptance process is to be terminated.

FIG. 12A illustrates a schematic view showing a client certificate creation screen. By the transmission of the HTTP response which contains aforementioned client certificate creation page, as shown in FIG. 12B, the client certificate creation screen is to be displayed on the display unit 39 of access source PC 30. Specifically, the components of the client certificate creation screen include a text box which is for accepting input of an e-mail address of the owner to be written as subject information in the client certificate, and an "OK" button which is for transmitting an HTTP request which contains input values for the text box and that is for requesting creation of the client certificate. More specifically, upon pressing the "OK" button of this client certificate creation screen, an HTTP request for requesting creation of the client certificate which contains e-mail address of the owner is to be transmitted from the PC 30 to the MFP 10.

If the CPU 11 judges the received HTTP request is not the HTTP request for requesting the client certificate creation page (S560: NO), control proceeds to the step S570 where the CPU 11 judges whether the received HTTP request is aforementioned HTTP request for requesting creation of the client certificate. If the received HTTP request is judged as aforementioned HTTP request for requesting creation of the client certificate (S570: YES), control proceeds to the step S573 where the CPU 11 creates the client certificate signed with the server secret key which is stored in the flash memory 13 and the client secret key, and generates an HTTP response which contains the client certificate saving page that is a web page for saving (upload) the client certificate (S577). And then, this request acceptance process is to be terminated.

FIG. 12B illustrates a schematic view showing a client certificate saving screen which is indicated by the client certificate saving page. By the transmission of the HTTP response which contains aforementioned client certificate saving page, as shown in FIG. 12B, the client certificate saving screen is to be displayed on the display unit 39 of access source PC 30. Specifically, the client certificate saving screen includes an "SAVE IN A FILE" button which is for accepting upload operation of the client certificate. When this button is pressed, the client certificate is to be uploaded onto the access source PC 30. Besides, at the time of upload, the client secret key which is corresponding to the client public key indicated by the client certificate is also encrypted and uploaded onto the access source PC 30.

If the CPU 11 judges that the received HTTP request is not aforementioned HTTP request for requesting the creation of the client certificate (S570: NO), control proceeds to the step S580 where the CPU 11 judges whether the received HTTP request is the HTTP request for requesting the administrator setting page that is a web page for setting the administrator. If the received HTTP request is judged as the HTTP request for requesting the administrator setting page (S580: YES), control proceeds to the step S585 where the CPU 11 generates an HTTP response which contains the administrator setting page. And then, the request acceptance process is to be terminated.

FIG. 13 illustrates a schematic view showing an administrator setting screen which is indicated by an administrator setting page. By the transmission of the HTTP response which contains aforementioned administrator setting page, as shown in FIG. 13, the administrator setting screen is to be displayed on the display unit 39 of access source PC 30. Specifically, the components of the administrator setting screen include a text box which is for accepting input of an e-mail address of the administrator, and an "OK" button which is for transmitting an HTTP request which contains input values for the text box and that is for requesting setting of the administrator. More specifically, upon pressing the "OK" button of the administrator setting screen, an HTTP request for requesting setting of the administrator which contains e-mail address of the administrator is to be transmitted from the PC 30.

If the CPU 11 judges the received HTTP request is not the HTTP request for requesting the administrator setting page (S580: NO), control proceeds to the step S590 where the CPU 11 judges whether the received HTTP request is aforementioned HTTP request for requesting setting of the administrator. If the received HTTP request is judged as the HTTP request for requesting setting of administrator (S590: YES), control proceeds to the step S593 where the CPU 11 updates the administrator e-mail address stored in the flash memory 13 to be the administrator e-mail address stored in the HTTP request. After the end of the step, control proceeds to S597 where the CPU 11 transmits the HTTP response for notifying successful of setting to the access source PC 30. And then, the request acceptance process is to be terminated.

If the CPU 11 judges that the received HTTP request is not the aforementioned HTTP request for requesting setting of the administrator (S590: NO), the CPU 11 executes a step to generate other HTTP responses corresponding to the HTTP request (S599). And then, after the end of the step, this request acceptance process is to be terminated.

referring back to FIG. 5, if the CPU 11 judges that the event occurred in the step S230 is not a cipher web access, control proceeds to the step S290 where the CPU 11 judges whether the occurred event is a non-cipher web access. If the occurred event is judged as a non-cipher web access (S290: YES), the CPU 11 receives the HTTP request transmitted from the access source PC 30 (S300), and generates a HTTP response corresponding to the received HTTP request (S310), and responds with the generated HTTP response to the access source PC 30 (S315). Then, control returns to the step S210.

If the event occurred in the step S290 is judged as also not a non-cipher web access (S290: NO), control proceeds to the step S320 where the CPU 11 judges whether the occurred event is an access to a port for a cipher printing. If the occurred event is judged as an access to a port for a cipher printing (S320: YES), the CPU 11 executes a cipher communication starting process shown FIG. 7 in the step S330.

If communication was interrupted in the cipher communication start process, the CPU 11 judges as YES in the step S340, and control returns to the step S210. On the other hand, when communication with the access source PC 30 is maintained without interruption in the cipher communication start process, the CPU 11 judges as NO in the step S340, and receives encrypted print data (S350) transmitted from the access source PC 30 in the step S160, then decrypts the received print data (S355). And then, control proceeds to the step S380 where the CPU 11 executes a printing process on the received print data, thus forms printing images on paper based on the print data through the printing unit 17. And then, control returns to the step S210.

If the event occurred in the step S320 is judged as not an access to a port for the cipher printing (S320: NO), control proceeds to the step S360 where the CPU 11 judges whether the occurred event is an access to a port for the non-cipher printing. If the occurred event is judged as an access to a port for the non-cipher printing (S360: YES), control proceeds to the step S370 where the CPU 11 receives not encrypted print data from the access source PC 30 (S370), then, executes a printing process on the received print data in the step S380, thus, forms printing images on paper based on the print data through the printing unit 17. After the end of the step, control returns to the step S210.

Furthermore, if the event occurred in the step S360 is judged as also not an access to a port for the non-cipher printing (S360: NO), control proceeds to the step S390 where the CPU 11 executes a step corresponding to the occurred event. Then, control returns to the step S210.

Hereinabove, the communication system 1 according to the first embodiment has been described, and according to the communication system 1, the CPU 11 in the MFP 10 judges whether transmission conditions on a warning mail are satisfied based on the period of validity which is written in its own server certificate (S221-S225: corresponding to a transmission condition judgment unit). If the transmission conditions are judged as satisfied (S225: YES), the MFP 10 generates a warning mail which is provided with link information to the server certificate creation page where updating operation on the server certificate is acceptable (S227: corresponding to a mail generating unit). Also, the MFP 10 sets an administrator e-mail address as the destination of the warning mail (S228: corresponding to an destination setting system), then transmits the warning mail to the administrator e-mail address (S229: corresponding to a mail transmission unit).

Further, according to the embodiment, the CPU 11 in the MFP 10 judges whether transmission conditions on a warning mail are satisfied based on the period of validity which is written in the client certificate at receiving the client certificate (S471-S473: corresponding to a transmission condition judgment unit). If the transmission conditions are judged as satisfied (S473: YES), the MFP 10 generates a warning mail which is provided with link information to the client certificate saving page where updating operation on the client certificate is acceptable (S475). Also, the MFP 10 sets an owner e-mail address which is written in the client certificate as the destination of the warning mail (S477: corresponding to a destination setting unit), then transmits the warning mail to the owner e-mail address (S479: corresponding to a mail transmission unit).

In the communication system 1 according to the embodiment, when the period of validity of the server certificate is getting close, a warning mail, which is provided with link information to the server certificate creation page, is transmitted to the administrator of the MFP 10. Such a configuration males it possible to prompt the administrator effectively to update the server certificate. Also, according to the embodiment, the warning mail is provided with link information so that the server certificate creation screen can be displayed easily, that allows the administrator to carry out the updating operation on the server certificate easily. Thus, according to the embodiment, workload concerning the updating operation of the server certificate will be reduced so that expiration of the server certificate may be prevented effectively.

Furthermore, in the communication system 1 according to the embodiment, when the period of validity of the client certificate is getting close, a warning mail, which is provided with link information to the client certificate saving page, is transmitted to the owner. Such a configuration makes it possible to prompt the owner effectively to update the client certificate and also workload concerning the updating operation of the client certificate will be reduced so that expiration of the client certificate may be prevented effectively.

Moreover, the MFP 10 according to the embodiment has a function for causing the PC 30 to display the server certificate viewing page which indicates the contents of the server certificate in accordance with the request signal (HTTP request) of the server certificate viewing page inputted through the communication I/F 15 (S523, S280, S285: corresponding to a certificate displaying unit). Therefore, in the case that the remaining time which is written in the server certificate is not over the number of predetermined days L2 and the elapsed time from the last viewing time of the server certificate is over the number of predetermined days L1, the CPU 11 transmits aforementioned warning mail concerning the server certificate. In other cases, the CPU 11 does not transmit aforementioned warning mail concerning the server certificate.

Thus, according to the communication system 1, transmission of the warning mail is switched between "to transmit" and "not to transmit" depending on the server certificate viewing situation by the administrator that allows to transmit the warning mail aggressively to administrators having low ability on time-limit administration while allows to prevent annoying administrators by the warning mail which is delivered regardless of the administrator who already checked information relating to the server certificate.

Second Embodiment

Incidentally, according to the first embodiment, when the period of validity of the digital certificate is getting close, the user with the corresponding e-mail address is given a warning about it by e-mail, however, when the period of validity of the digital certificate is getting close, a digital certificate may be newly generated and transmitted being attached to an e-mail as described below in a second embodiment.

Figure 14:
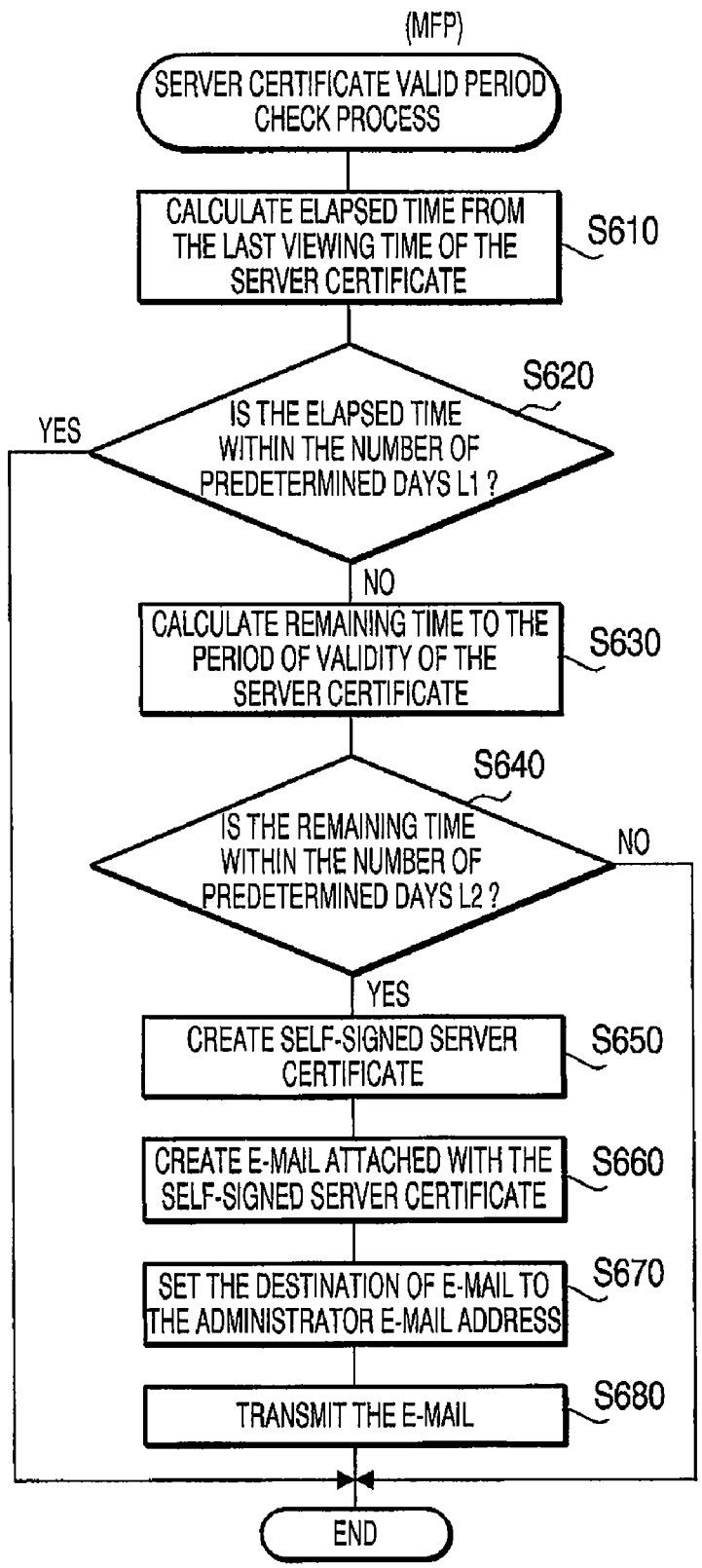
FIG. 14 is a flowchart showing a server certificate valid period check process to be executed by the MFP according to a second embodiment.
Figure 15:
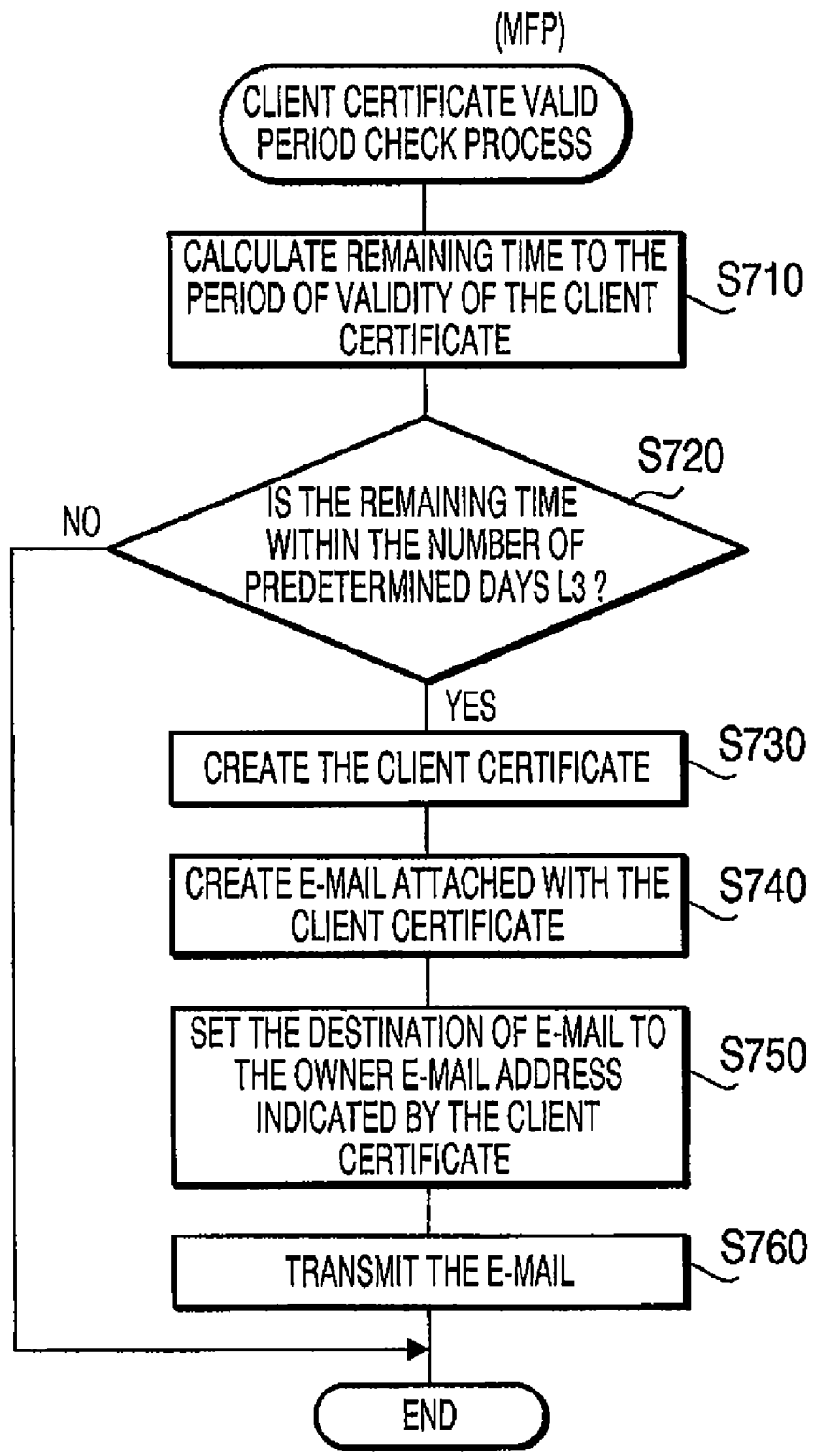
FIG. 15 is a flowchart showing a client certificate valid period check process to be executed by the MFP according to the second embodiment.

FIG. 14 is a flowchart showing a server certificate valid period check process to be executed in the step S220 by the CPU 11 in the MFP 10 of the communication system 1 according to a second embodiment. FIG. 15 is a flowchart showing a client certificate valid period check process to be executed in the step S470 by the CPU 11 in the MFP 10 of the communication system 1 according to the second embodiment.

The communication system 1 according to the second embodiment is different barely on details in the server certificate valid period check process and details in the client certificate valid period check process from the first embodiment, and has almost the same configuration in other processes with the communication system 1 according to the first embodiment. Therefore, in the communication system 1 according to the second embodiment, hereinafter only on the server certificate valid period check process which CPU 11 executes in the step S220, and the client certificate valid period check process which CPU 11 executes in the step S470 will be described.

As shown in FIG. 14, at the start of the server certificate valid period check process according to the second embodiment, the CPU 11 calculates elapsed time from the server certificate was checked by the administrator, based on the last viewing time of the server certificate which is stored in the flash memory 13 (S610). After the end of the step, the CPU 11 judges whether the calculated elapsed time is within the number of predetermined days L1 (S620). If the elapsed time is judged to be within the number of predetermined days L1 (S620: YES), the server certificate valid period check process is to be terminated without executing the steps S630-S680.

On the other hand, if aforementioned elapsed time is judged to be over the number of predetermined days L1 (S620: NO), control proceeds to the step S630 where the CPU 11 calculates its own remaining time to the period of validity (time to expiration) of the server certificate which is stored in the flash memory 13. Next, the CPU 11 judges whether the remaining time is within the number of predetermined days L2 (S640). If the remaining time is judged to be within the number of predetermined days L2 (S640: YES), control proceeds to the step S650. If the remaining time is judged to be over the number of predetermined days L2 (S640: NO), the server certificate valid period check process is to be terminated without executing the steps S650-S680.

In the step S650, the CPU 11 newly creates a server certificate in the form of extending the period of validity of the server certificate which is stored in the flash memory 13. At the time, also a server secret key is to be generated as necessary.

After the end of the step, the newly created server certificate is encrypted together with the server secret key based on the password to generate a certificate file, and thus an e-mail attached with the certificate file is to be created (S660). In this regard, at the time of encrypting server certificate, the server certificate is to be encrypted by using a predetermined password for the server certificate encryption.

After the end of the step S660, the e-mail address of administrator, which is stored in the flash memory 13, is set for the destination of the e-mail (S670). Then, after the end of the step S670, by transmitting aforementioned e-mail to the mail server 3, the CPU 11 transmits aforementioned e-mail to the e-mail address of the administrator through the mail server 3 (S680). And then, this server certificate valid period check process is to be terminated.

As shown in FIG. 15, at the start of client certificate valid period check process, the CPU 11 calculates remaining time (time to expiration) to the period of validity (expiration date and time of effective term) of the received client certificate (S710), and judges whether the remaining time is within the number of predetermined days L3 (S720). If the remaining time is judged to be within the number of predetermined days L3 (S720: YES), control proceeds to the step S730. If the remaining time is judged to be over the number of predetermined days L3 (S720: NO), the client certificate valid period check process is to be terminated without executing the steps S730-S760.

In the step S730, the CPU 11 newly creates a client certificate in the form of extending the period of validity of the received client certificate. At the time, also a client secret key is to be generated as necessary. After the end of the step, the newly created client certificate is encrypted together with the client secret key to generate a certificate file, and thus an e-mail attached with the certificate file is to be created (S740). In this regard, at the time of encrypting client certificate, the client certificate is to be encrypted by using a predetermined password for the client certificate encryption.

After the end of the step S740, the e-mail address of owner, which is indicated by the subject information of the received client certificate, is set for the destination of the e-mail (S750). Then, after the end of the step S750, by transmitting aforementioned e-mail to the mail server 3, the CPU 11 transmits aforementioned e-mail to the e-mail address of the main user of the access source PC 30 through the mail server 3 (S760). And then, this client certificate valid period check process is to be terminated.

Hereinabove, the communication system 1 according to the second embodiment has been described, and according to the communication system 1, the CPU 11 in the MFP 10 judges whether update conditions of the server certificate are satisfied based on the period of validity which is written in its own server certificate (S610-S640: corresponding to an update condition judgment unit). If the update conditions are judged as satisfied (S640: YES), the MFP 10 newly creates a server certificate of which period of validity is updated (S650: corresponding to a certificate updating unit), and generates an e-mail which is attached with this server certificate (S660: corresponding to a mail generating unit). Also, the MFP 10 sets an administrator e-mail address as the destination of this e-mail (S670: corresponding to a destination setting unit), and then transmits aforementioned e-mail to the administrator e-mail address (S680: corresponding to a mail transmission unit).

Further, according to the second embodiment, the CPU 11 in the MFP 10 judges whether update conditions of the client certificate are satisfied based on the period of validity which is written in the client certificate at receiving the client certificate (S710-S720: corresponding to an update condition judgment unit). If the update conditions are judged as satisfied (S720: YES), the MFP 10 newly creates a client certificate of which period of validity is updated (S730: corresponding to a certificate updating unit), and generates an e-mail which is attached with this client certificate (S740: corresponding to a mail generating unit). Also, the MFP 10 sets an owner e-mail address which is written in the received the client certificate as the destination of this e-mail (S750: corresponding to a destination setting unit), then transmits aforementioned e-mail to the owner e-mail address (S760: corresponding to a mail transmission unit).

Therefore, in the communication system 1 according to the second embodiment, when the period of validity of the server certificate is getting close, a server certificate of which period of validity is updated is newly created, and the e-mail attached with the server sertificate is transmitted to the administrator, so that the administrator side can use the validity-extended server certificate incorporating into the MFP 10 by importing the server certificate attached to the e-mail. Thus, according to the embodiment, workload concerning the updating operation of the server certificate will be reduced so that expiration of the server certificate may be prevented effectively.

Moreover, in the communication system 1 according to the second embodiment, when the period of validity of the client certificate is getting close, a client certificate of which period of validity is updated is newly created, and the e-mail attached with it is transmitted to the owner, so that the owner side can use the validity-extended client certificate for communication by importing the client certificate attached to the e-mail into software such as browser. Thus, according to the second embodiment, workload concerning the updating operation of the client certificate will be reduced so that expiration of the client certificate may be prevented effectively.

As thus far described, embodiments according to the present invention has been explained, however, the management apparatus and program thereof of the present invention is not to be limited to the embodiments described above, and further various aspects may be adopted. For example, the MFP 10 shown in FIG. 6 and FIG. 14 may also have a configuration that the operation in steps S222 and S620 are not to be executed in the server certificate valid period check process. That means the steps S222 and S620 in the server certificate valid period check process shown in FIG. 6 and FIG. 14 can be replaced by an equivalent process to be always judged as NO in the steps S222 and S620.

What is claimed is:

1. A management apparatus for managing a digital certificate which is written with a period of validity, comprising:
    a storage unit configured to store a target digital certificate, which comprises information regarding the period of validity of the target digital certificate;
    a hardware-implemented processor configured to control:
        a certificate displaying unit to display information relating to the target digital certificate, which is stored in the storage unit, responding to a viewing request signal inputted through an interface;
        a transmission condition judgment unit to refer to the target digital certificate and to judge whether a predetermined transmission condition is satisfied based on an elapsed time from a last displaying time of information relating to the target digital certificate by the certificate displaying unit and the period of validity of the target digital certificate;
        a mail generating unit to generate an e-mail provided with link information to a web page where updating operation on the target digital certificate is acceptable if the predetermined transmission condition is judged as satisfied by the transmission condition judgment unit;
        a destination setting unit to set a destination e-mail address of the e-mail generated by the mail generating unit; and
        a mail transmission unit to transmit the e-mail generated by the mail generating unit to the destination e-mail address set by the destination setting unit;
    wherein the predetermined transmission condition is judged to be satisfied, such that the mail generating unit generates the e-mail, when the remaining time to the period of validity written in the digital certificate is less than or equal to a predetermined threshold and the elapsed time is greater than or equal to a predetermined criterion time;
    wherein the predetermined transmission condition is judged to be not satisfied, such that the mail generating unit does not generate the e-mail, when the remaining time to the period of validity written in the digital certificate is greater than the predetermined threshold or the elapsed time is less than the predetermined criterion time; and
    wherein the predetermined criterion time is different than a time from a last updating time of the target certificate.

2. The management apparatus according to claim 1, wherein:
    the target digital certificate is written with an e-mail address of an owner of the digital certificate; and
    the processor is configured to control the destination setting unit to set the e-mail address of the owner, which is written in the target digital certificate, as the destination e-mail address if the predetermined transmission condition is judged as satisfied by the transmission condition judgment unit.

3. A management apparatus for managing a digital certificate which is written with a period of validity, comprising:
    a storage unit configured to store a target digital certificate, which comprises information regarding the period of validity of the target digital certificate;
    a hardware-implemented processor configured to control:
        a certificate displaying unit to display information relating to the target digital certificate, which is stored in the storage unit, responding to a viewing request signal inputted through an interface;
        an update condition judgment unit to refer to the target digital certificate and to judge whether a predetermined update condition is satisfied based on an elapsed time from a last displaying time of information relating to the target digital certificate by the certificate displaying unit and the period of validity written in the target digital certificate;
        a certificate updating unit to update the target digital certificate if the predetermined update condition is judged as satisfied by the update condition judgment unit;
        a mail generating unit to generate an e-mail attached with the updated digital certificate when the target digital certificate is updated by the certificate updating unit;
        a destination setting unit to set a destination e-mail address of the e-mail generated by the mail generating unit; and
        a mail transmission unit to transmit the e-mail, including the attached updated digital certificate, generated by the mail generating unit to the destination e-mail address set by the destination setting unit, without using the updated digital certificate;
    wherein the predetermined update condition is judged to be satisfied, such that the certificate updating unit updates the target digital certificate, when the remaining time to the period of validity written in the digital certificate is less than or equal to a predetermined threshold and the elapsed time is greater than or equal to a predetermined criterion time;
    wherein the predetermined update condition is judged to be not satisfied, such that certificate updating unit does not update the target digital certificate, when the remaining time to the period of validity written in the digital certificate is greater than the predetermined threshold or the elapsed time is less than the predetermined criterion time; and
    wherein the predetermined criterion time is different than a time from a last updating time of the target certificate.

4. The management apparatus according to claim 3, wherein:
    the target digital certificate is written with an e-mail address of an owner of the target digital certificate; and the controller is configured to control the destination setting unit to set the e-mail address of the owner, which is written in the updated target digital certificate, as the destination e-mail address when the target digital certificate is updated by the certificate updating unit.

5. A non-transitory computer readable medium having computer readable instructions stored thereon, which, when executed by a computer functioning as a management apparatus for managing a digital certificate which is written with a period of validity, are configured to:

store a target digital certificate, which comprises information regarding the period of validity of the target digital certificate;

display information relating to the target digital certificate, which is stored, responding to a viewing request signal inputted through an interface, judge whether a predetermined transmission condition is satisfied based on an elapsed time from a last displaying time of information relating to the target digital certificate and the period of validity written in the target digital certificate;

generate an e-mail provided with link information to a web page where updating operation on the target digital certificate is acceptable if the predetermined transmission condition is judged as satisfied;

set a destination e-mail address of the generated e-mail; and transmit the e-mail to the destination e-mail address;

wherein the predetermined transmission condition is judged to be satisfied, such that the e-mail is generated, when the remaining time to the period of validity written in the digital certificate is less than or equal to a predetermined threshold and the elapsed time is greater than or equal to a predetermined criterion time;

wherein the predetermined transmission condition is judged to be not satisfied, such that the e-mail is not generated, when the remaining time to the period of validity written in the digital certificate is greater than the predetermined threshold or the elapsed time is less than the predetermined criterion time; and wherein the predetermined criterion time is different than a time from a last updating time of the target certificate.

6. A non-transitory computer readable medium having computer readable instructions stored thereon, which, when executed by a computer functioning as a management apparatus for managing a digital certificate which is written with a period of validity, are configured to:

store a target digital certificate, which comprises information regarding the period of validity of the target digital certificate;

display information relating to the target digital certificate, which is stored, responding to a viewing request signal inputted through an interface;

judge whether a predetermined update condition is satisfied based on an elapsed time from a last displaying time of information relating to the target digital certificate and the period of validity written in the target digital certificate;

update the target digital certificate if the predetermined update condition is judged as satisfied;

generate an e-mail attached with the updated digital certificate if the target digital certificate is updated;

set a destination e-mail address of the generated e-mail; and transmit the e-mail, including the attached updated digital certificate, to the destination e-mail address, without using the updated digital certificate;

wherein the predetermined update condition is judged to be satisfied, such that the target digital certificate is updated, when the remaining time to the period of validity written in the digital certificate is less than or equal to a predetermined threshold and the elapsed time is greater than or equal to a predetermined criterion time;

wherein the predetermined update condition is judged to be not satisfied, such that the target digital certificate is not updated, when the remaining time to the period of validity written in the digital certificate is greater than the predetermined threshold or the elapsed time is less than the predetermined criterion time; and wherein the predetermined criterion time is different than a time from a last updating time of the target certificate.

* * * * *